United States Patent
Ayres et al.

(10) Patent No.: US 10,845,599 B2
(45) Date of Patent: Nov. 24, 2020

(54) PUPIL EQUALIZATION

(71) Applicant: Akonia Holographics LLC, Longmont, CO (US)

(72) Inventors: Mark Ayres, Longmont, CO (US); Adam Urness, Longmont, CO (US); Kenneth Anderson, Longmont, CO (US); Friso Schlottau, Longmont, CO (US)

(73) Assignee: Akonia Holographics LLC, Longmont, CO (US)

( * ) Notice: Subject to any disclaimer, the term of this patent is extended or adjusted under 35 U.S.C. 154(b) by 102 days.

(21) Appl. No.: 16/089,702

(22) PCT Filed: Mar. 1, 2017

(86) PCT No.: PCT/US2017/020298
§ 371 (c)(1),
(2) Date: Sep. 28, 2018

(87) PCT Pub. No.: WO2017/176393
PCT Pub. Date: Oct. 12, 2017

(65) Prior Publication Data
US 2019/0101760 A1    Apr. 4, 2019

Related U.S. Application Data

(63) Continuation-in-part of application No. PCT/US2016/048499, filed on Aug. 24, 2016, which
(Continued)

(51) Int. Cl.
*G02B 27/01*    (2006.01)
*G02F 1/295*    (2006.01)
(Continued)

(52) U.S. Cl.
CPC ....... *G02B 27/0172* (2013.01); *G02B 6/0038* (2013.01); *G02F 1/295* (2013.01);
(Continued)

(58) Field of Classification Search
CPC .............. G02B 27/0172; G02B 6/0038; G02B 2027/0178; G02B 2027/0174;
(Continued)

(56) References Cited

U.S. PATENT DOCUMENTS

| | | | |
|---|---|---|---|
| 4,017,158 | A | 4/1977 | Booth |
| 4,930,847 | A | 6/1990 | Cederquist |

(Continued)

FOREIGN PATENT DOCUMENTS

| | | |
|---|---|---|
| CN | 103823267 A | 5/2014 |
| CN | 104777535 A | 7/2015 |

(Continued)

OTHER PUBLICATIONS

Beyer et al. Holographic recording of Bragg gratings for wavelength division multiplexing in doped and partially polymerized poly (methyl methacrylate). Applied Optics, vol. 42, No. 1. Jan. 1, 2003. [Retrieved Apr. 17, 2017]. retrieved from Internet: <http://www.researchgate.net/publication/10958423_Holographic_Recording_of_Bragg_Gratings_for_Wavelength_Division_Multiplexing_in_Doped_and_Partially_Polymerized_Polymethyl_methacrylate>.

*Primary Examiner* — William R Alexander
*Assistant Examiner* — Henry A Duong
(74) *Attorney, Agent, or Firm* — Michael H. Lyons

(57) ABSTRACT

An optical reflective device for pupil equalization including at least one or more grating structures within a grating medium is disclosed. The grating structures may have reflective axes that need not be constrained to surface normal. The grating structures are configured to reflect light about substantially constant reflective axes across a relatively wide
(Continued)

range of wavelengths. The optical reflective device may reflect light towards a specific location, such as an exit pupil or eye box. Each grating structure within the device may be configured to reflect light of a particular wavelength at a plurality of incidence angles.

36 Claims, 13 Drawing Sheets

Related U.S. Application Data is a continuation-in-part of application No. 15/174,938, filed on Jun. 6, 2016, now Pat. No. 10,180,520.

(60) Provisional application No. 62/407,994, filed on Oct. 13, 2016, provisional application No. 62/318,917, filed on Apr. 6, 2016, provisional application No. 62/352,529, filed on Jun. 20, 2016, provisional application No. 62/318,027, filed on Apr. 4, 2016.

(51) Int. Cl.
*F21V 8/00* (2006.01)
*G03H 1/04* (2006.01)

(52) U.S. Cl.
CPC ... *G03H 1/0402* (2013.01); *G02B 2027/0174* (2013.01); *G02B 2027/0178* (2013.01); *G03H 2001/0439* (2013.01)

(58) Field of Classification Search
CPC .... G02B 2027/0105; G02B 2027/0109; G02B 2027/0118; G02B 5/18; G02B 5/32; G02B 27/01; G02F 1/295; G03H 1/0402; G03H 2001/0439; G03H 1/28; G03H 1/0248; G03H 1/0005; G03H 2001/0077
USPC ............................................................. 359/15
See application file for complete search history.

(56) References Cited

U.S. PATENT DOCUMENTS

| | | |
|---|---|---|
| 6,882,452 B2 | 4/2005 | Decker et al. |
| 7,418,170 B2 | 8/2008 | Mukawa et al. |
| 7,502,168 B2 | 3/2009 | Akutsu et al. |
| 7,764,413 B2 | 7/2010 | Levola |
| 8,160,411 B2 | 4/2012 | Levola et al. |
| 8,233,204 B1 | 7/2012 | Robbins et al. |
| 8,446,675 B1 | 5/2013 | Wang et al. |
| 8,665,178 B1 | 3/2014 | Wang |
| 8,903,207 B1 | 12/2014 | Brown et al. |
| 9,075,184 B2 | 7/2015 | Popovich et al. |
| 9,341,846 B2 | 5/2016 | Popovich et al. |
| 9,456,744 B2 | 10/2016 | Popovich et al. |
| 9,651,368 B2 | 5/2017 | Abovitz et al. |
| 2013/0250430 A1 | 9/2013 | Robbins et al. |
| 2014/0104665 A1 | 4/2014 | Popovich et al. |
| 2014/0140654 A1* | 5/2014 | Brown ................ G02F 1/29 385/10 |
| 2016/0154150 A1 | 6/2016 | Simmonds et al. |
| 2017/0031160 A1 | 2/2017 | Popovich et al. |
| 2017/0276940 A1 | 9/2017 | Popovich et al. |
| 2019/0094981 A1 | 3/2019 | Bradski et al. |

FOREIGN PATENT DOCUMENTS

| | | |
|---|---|---|
| JP | H11-265139 A | 9/1999 |
| JP | 2003222727 A | 8/2003 |
| JP | 2006293358 A | 10/2006 |
| JP | 2007-011057 A | 1/2007 |
| JP | 2007-094175 A | 4/2007 |
| JP | 2008530613 A | 8/2008 |
| JP | 2012103495 A | 5/2012 |
| JP | 2013098087 A | 5/2013 |
| WO | 2005-093493 | 10/2005 |

* cited by examiner

PUPIL EQUALIZATION

CROSS-REFERENCE TO RELATED PATENT APPLICATIONS

This application claims priority from co-pending U.S. application Ser. No. 15/174,938, filed 6 Jun. 2016 and titled "SKEW MIRRORS, METHODS OF USE, AND METHODS OF MANUFACTURE," 62/318,027, filed 4 Apr. 2016 and titled "SKEW MIRROR PUPIL EQUALIZATION," 62/318,917, filed 6 Apr. 2016 and titled "SKEW MIRRORS, METHODS OF USE, AND METHODS OF MANUFACTURE," 62/352,529, filed 20 Jun. 2016 and titled "SKEW MIRROR PUPIL EQUALIZATION," and 62/407,994, filed 13 Oct. 2016 and titled "TIGER PRISMS AND METHODS OF USE," and PCT Application No. PCT/US2016/048499, filed 24 Aug. 2016 and titled "SKEW MIRRORS, METHODS OF USE, AND METHODS OF MANUFACTURE." The above applications are incorporated herein by reference for all purposes, in their entireties.

BACKGROUND

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal (i.e., the reflective axis is perpendicular to the mirror surface). Because of this constraint on the reflective axis, a dielectric mirror is disposed in some devices in a configuration that is suboptimal. Similarly, the reflective axis being constrained to surface normal makes a dielectric mirror entirely inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light avoids the constraint inherent in conventional mirrors that the reflective axis coincide with surface normal. However, where a substantially constant reflective axis is required, a conventional grating structure is substantially limited to a single wavelength (or very narrow range of wavelengths) for a given angle of incidence. Similarly, a conventional grating structure is limited to a single angle of incidence (or very narrow range of incidence angles), in order to reflect light of a specified wavelength about a constant reflective axis.

Accordingly, requirements for a relatively simple device that reflects light about a reflective axis not constrained to surface normal, and whose angle of reflection for a given angle of incidence is constant across a range of incidence angles, are not met by currently available reflective devices comprising either reflective grating structures or conventional mirrors. A need therefore exists for such a reflective device, and such need may be acute in head-mounted display devices.

SUMMARY

The described features generally relate to one or more improved methods, systems, or devices for reflecting light and optical reflective devices comprising grating structures. The methods, systems, or devices may employ selective coupling to allow a skew mirror to form an external exit pupil where all or most reflected light is directed. The method of forming an exit pupil at a location other than the skew mirror holographic optical element itself may be described as skew mirror pupil equalization. In an implementation, such as a head mounted display, the spatial distribution of the line segment-like k-space index distribution may be configured so as to produce diffraction towards the exit pupil. Skew mirror pupil equalization may additionally improve photometric efficiency (e.g., image brightness) by directing a higher percentage of photons to the exit pupil.

In some examples, a device for reflecting light is described. The device may include a grating medium. A first grating structure within the grating medium may be configured to reflect light of a wavelength about a reflective axis offset from a surface normal of the grating medium at a first plurality of incidence angles (e.g., including a first incidence angle). Additionally, a second grating structure may be within the grating medium, such that the second grating structure is at least partially non-overlapping with the first grating structure. The second grating structure may be configured to reflect light of the wavelength about the reflective axis offset from a surface normal of the grating medium at a second plurality of incidence angles (e.g., including a second incidence angle) different from the first plurality of incidence angles.

In some examples, a method of manufacturing an apparatus for reflecting light is described. The method may include forming a grating medium configured to reflect light and forming a first grating structure within the grating medium. The first grating structure may be configured to reflect light of a wavelength about a reflective axis offset from a surface normal of the grating medium at a first plurality of incidence angles (e.g., including a first incidence angle). Additionally, the method may include forming a second grating structure within the grating medium such that the second grating structure is at least partially non-overlapping with the first grating structure. The second grating structure may be configured to reflect light of the wavelength about the reflective axis offset from a surface normal of grating medium at a second plurality of incidence angles (e.g., including a second incidence angle) different from the first plurality of incidence angles.

In some examples, a method of reflecting light is described. The method may include reflecting, by a first grating structure within a grating medium, at least a first portion of the light of a wavelength about a reflective axis offset from a surface normal of the grating medium at a first plurality of incidence angles (e.g., including a first incidence angle). The method may also include reflecting, by a second grating structure within the grating medium, at least a second portion of the light of the wavelength about the reflective axis offset from a surface normal of a grating medium within the grating medium at a second plurality of incidence angles (e.g., including a second incidence angle) different from the first plurality of incidence angles. The second grating structure within the grating medium may be at least partially non-overlapping with the first grating structure. In some cases, the grating medium may be disposed in a waveguide that includes the grating medium and at least two substrates.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
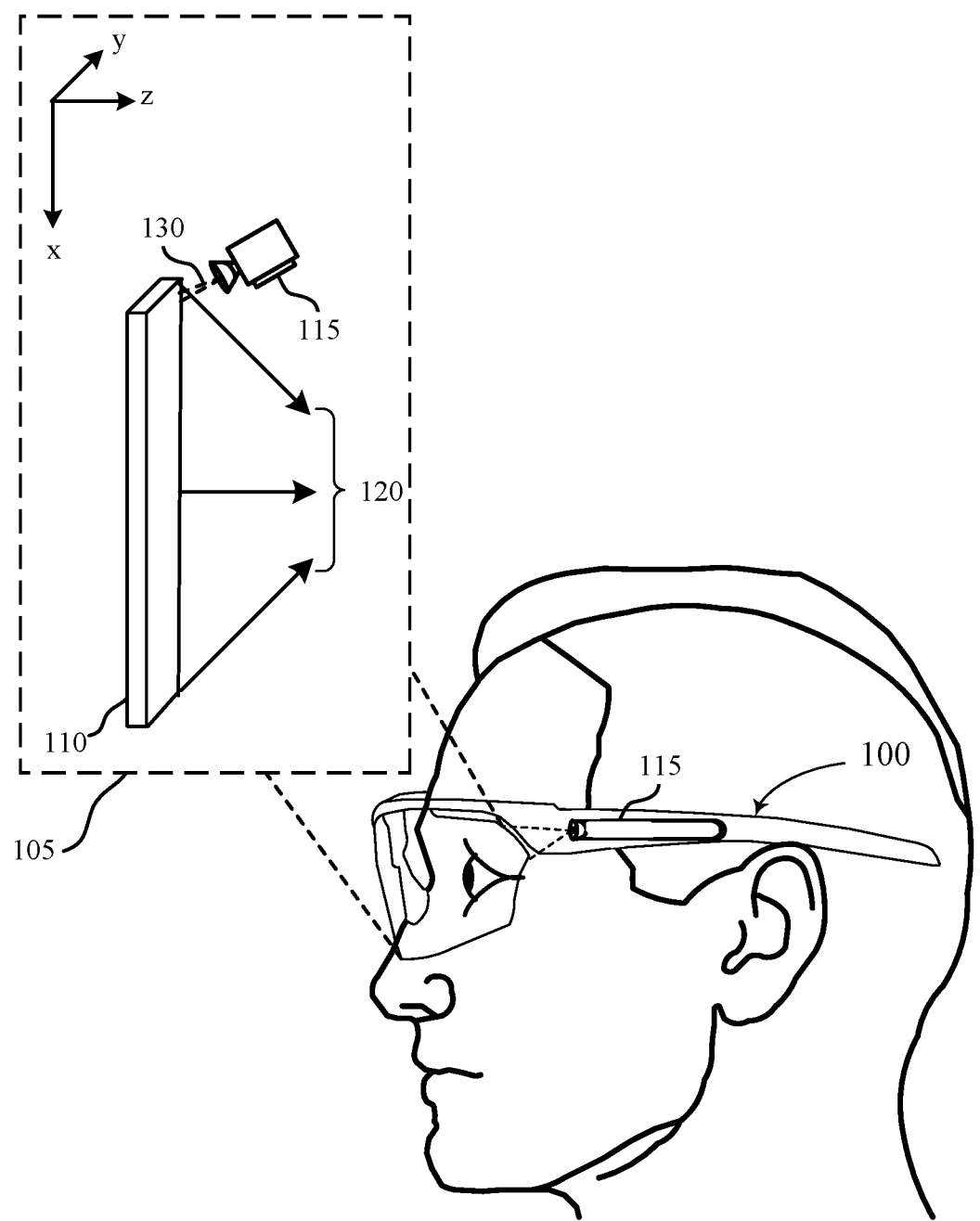
FIG. 1 is an illustration of a head mounted display (HMD) in which the principles included herein may be implemented.

An optical head-mounted display (HMD) is a wearable device that has the capability of reflecting projected images as well as allowing a user to experience augmented reality. Head-mounted displays typically involve near-eye optics to create "virtual" images. In the past HMDs have dealt with a variety of technical limitations that reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength.

Accordingly, a device for reflecting light may include features that reflect light about a reflective axis not constrained to surface normal and whose angle of reflection for a given angle of incidence is constant at multiple wavelengths. Embodiments of the device may have substantially constant reflective axes (i.e., reflective axes that have reflective axis angles that vary by less than 1.0 degree) across a range of incidence angles for incident light of a given wavelength, and this phenomenon may be observed with incident light at various wavelengths. In some embodiments, the reflective axes remain substantially constant for every combination of a set of multiple incidence angles and a set of multiple wavelengths. Aspects of the disclosure are initially described in the context of an apparatus for reflecting light towards an eye box situated at a fixed distance away from a skew mirror. Specific examples are described for apparatus including a grating medium. The grating medium may include one or more grating structures. A grating structure may be configured to reflect light of a particular wavelength about a reflective axis offset from a surface normal of the grating medium at a particular plurality of incidence angles. Aspects of the disclosure are further illustrated by and described with reference to apparatus diagrams, system diagrams, and flowcharts that relate to skew mirror pupil equalization.

This description provides examples, and is not intended to limit the scope, applicability or configuration of implementations of the principles described herein. Rather, the ensuing description will provide those skilled in the art with an enabling description for implementing embodiments of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

Terminology

The term "approximately," refers to plus or minus 10% of the value given.

The term "about," refers to plus or minus 20% of the value given.

The term "principally" with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space).

The term "diffraction efficiency" refers to the ratio of the power of reflected light to incident light and on a grating medium.

The term "entrance pupil" refers to a real or virtual aperture passing a beam of light, at its minimum size, entering into imaging optics.

The term "eye box" refers to a two-dimensional area outlining a region wherein a human pupil may be placed for viewing the full field of view at a fixed distance from a grating structure.

The term "eye relief" refers to a fixed distance between a grating structure and a corresponding eye box.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector. In some cases, an exit pupil may comprise a subset of a beam of light emerging from imaging optics.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium.

FIG. 1 is an illustration of a head mounted display (HMD) 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides a volume hologram or other grating structure. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the angle of diffraction is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some examples, the lens assembly and skew mirror 110 may be substantially flat with respect to the x-y plane; however the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be superimposed within the grating medium of the skew mirror 110. The skew mirror 110 may have a substantially constant reflective axis (i.e., each grating structure of the skew mirror 110 has a same substantially constant reflective axis).

In some examples, a head mounted display device may comprise a light source or light projector 115 for providing image-bearing light and a lens assembly. The lens assembly may include skew mirror 110. The lens assembly may comprise a light input section for receiving the image-bearing light from the light source or light projector 115. A waveguide may be disposed within the lens assembly and be operatively coupled to the light input section. The waveguide may comprise at least two substrates (not shown), a grating medium disposed between the at least two substrates, a first grating structure within the grating medium, and a second grating structure within the grating medium. In some examples, the waveguide may be omitted and the light source or light projector 115 may be operatively coupled to the lens assembly in a free space configuration. The first grating structure may be configured to reflect light of a wavelength about a first reflective axis of the first grating structure offset from a surface normal of the grating medium. The first grating structure may be configured to reflect light at a first incidence angle. The second grating structure may be configured to be at least partially non-overlapping with the first grating structure. The second grating structure may be configured to reflect light of the same wavelength as light reflected by the first grating structure. The second grating structure may be configured to reflect light of the wavelength about a second reflective axis of the second grating structure offset from the surface normal of the grating medium. The second grating structure may be configured to reflect light at a second incidence angle different from the first incidence angle.

Figure 2A:
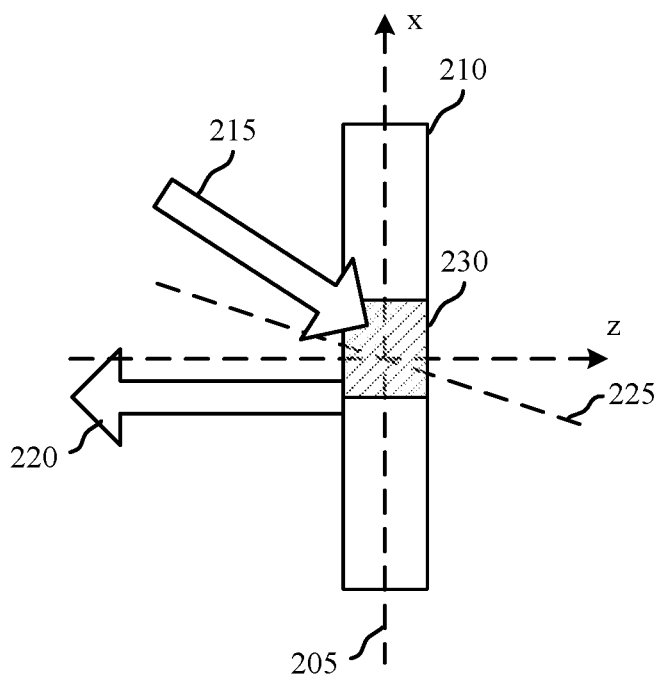
FIG. 2A is a diagram illustrating reflective properties of a skew mirror in real space in accordance with various aspects of the disclosure.

FIG. 2A is a cross-section view 200 illustrating reflective properties of a skew mirror 210 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for pupil equalization may be partially reflective. In this manner, a skew mirror for pupil equalization may be configured to selectively reflect the rays of light where they are needed to form an exit pupil towards an eye box. The skew mirror for pupil equalization may be configured to avoid reflecting the rays of light for certain incidence angles where such a reflection would reflect the rays of light to an area that is not toward the desired exit pupil. Implementations of some skew mirror embodiments may require relatively high dynamic range recording medium to achieve high reflectivity over a relatively wide wavelength bandwidth and angle range for the resulting grating medium. By contrast, a skew mirror for pupil equalization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of equal brightness.

The skew mirror 210 is characterized by the reflective axis 225 at an angle measured with respect to the z-axis. The z-axis is normal to the skew mirror axis 205. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
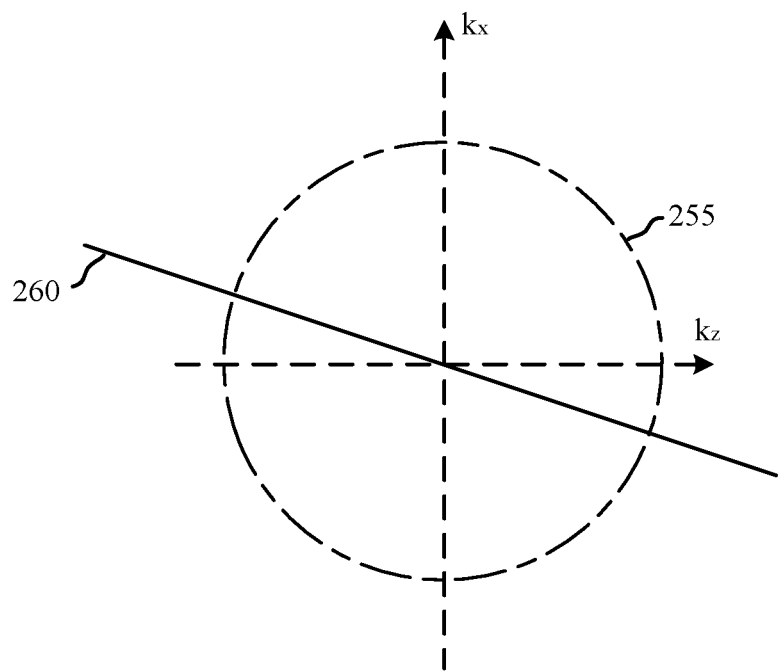
FIG. 2B illustrates a skew mirror in k-space in accordance with various aspects of the disclosure.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 passes through the origin, and has an angle measured with respect to the z-axis, equal to that of the reflective axis 225. Recording k-sphere 255 is the k-sphere corresponding to a particular writing wavelength. K-space 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r \exp(i\vec{k}_r \cdot \vec{r}) \xrightarrow{\mathcal{F}} E_r(\vec{k}) = A_r \delta(\vec{k} - \vec{k}_r), \tag{1}$$

where $E_r(\vec{r})$ is the optical scalar field distribution at all $\vec{r} = \{x,y,z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}_r| = k_n$. Thus, all optical propagation vectors must lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}), \quad (2)$$

where $E_1(\vec{r})$ is the spatial distribution of the first recording beam field and $E_2(\vec{r})$ is the spatial distribution of the second recording beam field. The unary operator "*" denotes complex conjugation. The final term in equation (2), $E_1(\vec{r})E_2^*(\vec{r})$, maps the incident second recording beam into the diffracted first recording beam. Thus the following equation may result:

$$E_1(\vec{r})E_2^*(\vec{r}) \xrightarrow{\mathcal{F}} E_1(\vec{k}) \otimes E_2(\vec{k}), \quad (3)$$

where $\otimes$ is the 3D cross correlation operator. This is to say, the product of one optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ are grating vectors from the respective hologram $\Delta n(\vec{k})$ k-space distributions to the origin (not shown individually). Note that by convention, wave vectors are represented by a lowercase "k" and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k}) \Big|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator. The notation "$\big|_{|\vec{k}|=k_n}$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, typically used here when describing skew mirror properties in k-space, is analogous to the term incident light, which is typically used here when describing skew mirror reflective properties in real space. Similarly, the term diffracted beam, typically used here when describing skew mirror properties in k-space, is analogous to the term principal reflected light, typically used here when describing skew mirror properties in real space. Thus when describing reflective properties of a skew mirror in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3A:
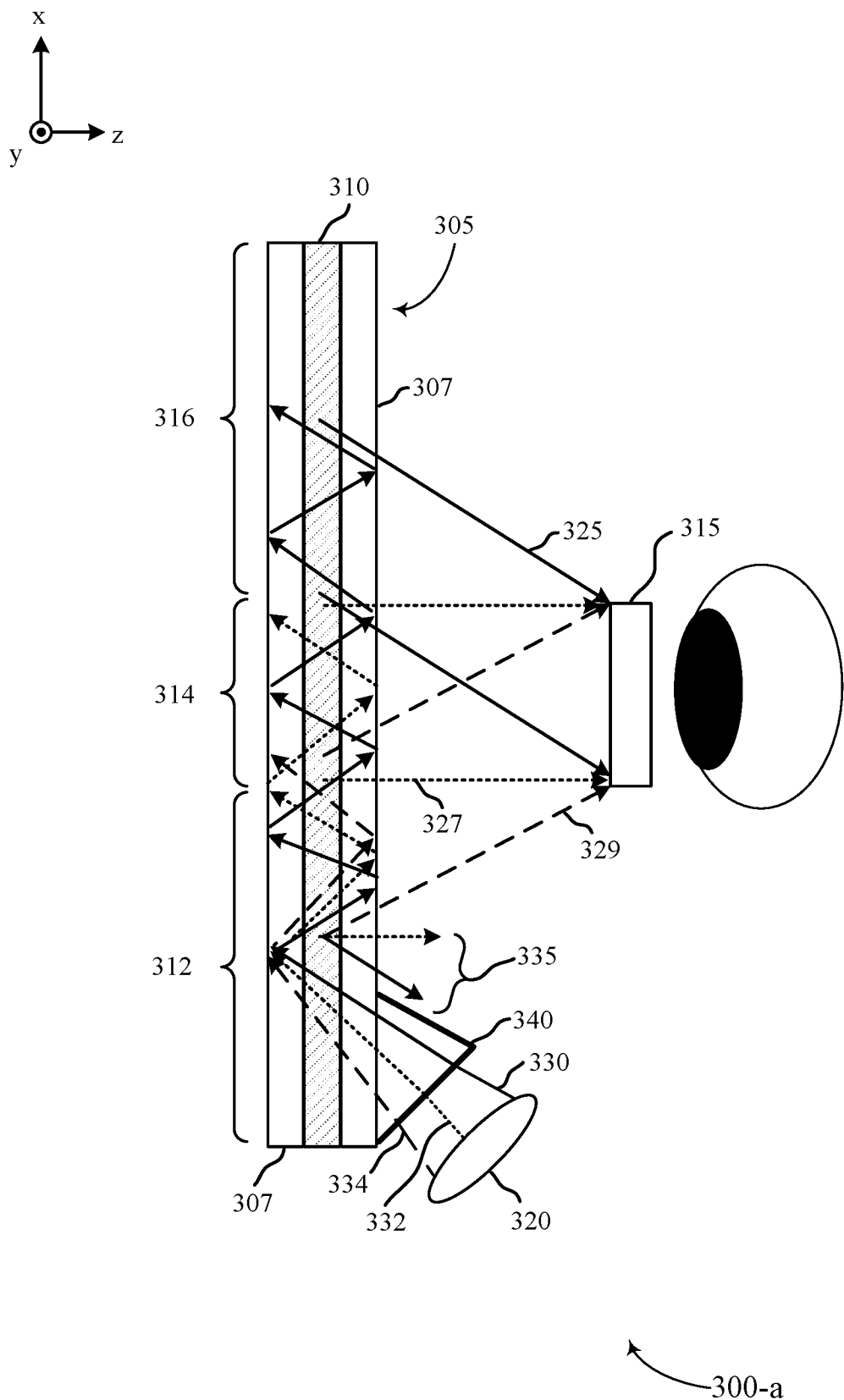
FIG. 3A is a diagram of an optical system incorporating skew mirror exit pupil equalization in accordance with various aspects of the disclosure.

FIG. 3A illustrates a diagram of an optical system 300-a incorporating skew mirror exit pupil equalization. Optical system 300-a may be utilized in an HMD, augmented reality (AR), or virtual reality (VR) application such as, but not limited to, the HMD 100 of FIG. 1. Optical system 300-a may also be utilized in various optical coupling applications such as, but not limited to, large screen display and optical sensor applications. The optical system 300-a may employ selective coupling to allow a skew mirror 305 to diffract light towards a specific location, such as an eye box 315, thereby improving photometric efficiency (e.g., image brightness). This may have an advantageous effect of producing an exit pupil at the eye box 315. The exit pupil may be a fixed distance from the skew mirror 305. An exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration. Optical system 300-a is viewed from an overhead perspective and could represent either the left or right eye of the user. For ease of description, optical system 300-a will be described from the left eye perspective of the user.

The skew mirror 305 and the grating medium 310 may both be located at least partially within a waveguide. Grating medium 310 may be at least partially or wholly enclosed by substrates 307 (e.g., glass covers or like protective layers). The skew mirror 305 may contain one or more grating structures within the grating medium 310. A grating structure is an optical device that may reflect, diffract, and/or split incident light into beams or waves that may then continue propagating in different directions. A grating may be characterized by its diffracted angle response. For a sinusoidal grating, the diffracted angle response may be expressed by:

$$\Delta \theta_r \cos \theta_r = -\Delta \theta_i \cos \theta_i \quad (5)$$

The diffracted angle response expresses the change in the angle of reflection, $\Delta\theta_r$, in response to small changes in the angle of incidence, $\Delta\theta_i$. In contrast, a true mirror has an angle response expressed by:

$$\Delta\theta_r = -\Delta\theta_i \qquad (6)$$

The angles in equation (5) and (6) are in k-space relative to the kz-axis.

A device substantially characterized by diffracted angle response may be said to exhibit grating-like reflective behavior, whereas a device substantially characterized by the true mirror angle response may be said to exhibit mirror-like reflective behavior. A device exhibiting grating-like reflective behavior will also exhibit a reflective axis that changes with angle of incidence, unless that reflective axis is normal to the device surface, in which case $\cos\theta_r = \cos\theta_i$. Accordingly, requirements for a relatively simple device that reflects light about a reflective axis not constrained to surface normal, and whose angle of reflection for angles of incidence spanning multiples of its angular Bragg selectivity is constant at wavelengths spanning multiples of its wavelength Bragg selectivity, may not be met by a single sinusoidal grating. As is known to those skilled in the art, a device that reflects light (e.g., a sinusoidal grating) may exhibit both angular and wavelength Bragg selectivity.

The grating medium 310 may be comprised of a photopolymer, photorefractive crystals, dichromated gelatin, photo-thermo-refractive glass, film containing dispersed silver halide particles, or other material with the ability to react to and record an incident interference pattern. The grating structures may be comprised of holograms, such as but not limited to, volume-phase holograms. Multiple holograms may be recorded into the grating medium internal volume and may thus extend below the grating medium surface. Accordingly, these holograms are sometimes referred to as volume holograms. In some implementations, each of the multiple holograms at least partially spatially overlaps at least one, but not all, of the other of the multiple holograms. In some examples, each of the multiple holograms at least partially spatially overlaps all of the other holograms. In some embodiments, some of the multiple holograms may not spatially overlap some of the other holograms.

For example, spatially overlapping holograms overlap with respect to the space occupied or volume shared by two holograms in a contiguous grating medium (e.g., two spatially overlapping holograms share or coexist in at least a portion of the same space or volume within the grating medium 310). In this manner, at least some of the varying refractive index properties and associated fringe patterns of a first hologram will occupy the same space or volume of (and be superimposed or intermingled with) at least some of the varying refractive index properties and associated fringe patterns of a second hologram within the grating medium 310. In examples where holograms do not spatially overlap, the two holograms do not intersect or overlap in any manner within a contiguous grating medium. For example, a first hologram may be disposed on a volumetric portion of the grating medium 310 spaced apart from a second hologram. In some embodiments, a skew mirror may include both spatially overlapping and spatially non-overlapping holograms within the grating medium 310.

Each grating structure within the grating medium 310 may be configured to reflect light about a reflective axis of the skew mirror 305. The reflective axis may be an example of the reflective axis 225 depicted in FIG. 2A. The reflective axis may be offset from a surface normal of the grating medium. Incident light and its reflection are bisected by the reflective axis such that the internal angle of incidence of the incident light relative to the reflective axis has the same magnitude as the internal angle of reflection of the reflected light relative to the reflective axis. That is, the incident light and its reflection may exhibit bilateral symmetry about the reflective axis. In some implementations, a grating structure may be configured to reflect light at a reflection angle that is between the plurality of incidence angles and the surface normal of the grating medium.

Each grating structure within the grating medium 310 may be configured to reflect light of one or more wavelengths at a particular plurality of incidence angles (the one or more wavelengths may include at least one visible red light wavelength, one visible blue light wavelength, and one visible green light wavelength). Each grating structure within the grating medium 310 may reflect light at a plurality of incidence angles that are different from a plurality of incidence angles corresponding to a different grating structure. Each grating structure within the grating medium 310 may be comprised of a plurality of sinusoidal volume gratings.

Optical system 300-$a$ illustrates a light source or light projector 320 (e.g., microdisplay illuminated by a light-emitting diode). The light may enter the skew mirror 305 through an input coupler 340. The input coupler 340 may be a prism or prism-like structure, a grating structure, a mirror or reflective structure, an edge facet or curved surface, or other input coupling techniques. The refractive index of the input coupler 340 may be index matched with a substrate 307 to which the input coupler 340 is coupled. In some examples, however, an input coupler may not be used to direct light (e.g., image-bearing light) to a skew mirror. The light may include a range of visible light (e.g., visible red light, visible blue light, and visible green light). For reflected light ray 325 to be reflected towards the eye box 315, incident light 330 must propagate by total internal reflection toward a third (e.g., right) region 316 of the grating medium 310. However, incident light 330 must pass through a first (e.g., left) region 312 and second (e.g., middle) region 314 of the grating medium 310 in order to reach the third region 316 of the grating medium 310. If, for example, a conventional grating structure were utilized in the grating medium 310, some light entering the waveguide would likely be misdirected (e.g., out-coupled as the light propagated), producing the wasted light 335 that does not reach the eye box 315. In optical system 300-$a$, however, at least some holograms that Bragg-match the light of the reflected light ray 325 (e.g., light of each wavelength of visible light of the reflected light ray 325) are not written in the first region 312 and second region 314 of the skew mirror 305, allowing the light to propagate undiminished to the first region 312 by selective coupling (e.g., by not writing holograms in the grating medium 310 that will reflect the light of reflected light ray 325 toward an area other than the eye box 315). In some examples, however, some wasted light may be produced even by a skew mirror employing selective coupling, for example, if a grating in the first region intended to direct blue light upwards towards the eye box also directs green rightwards that misses the eye box. Embodiments of optical system 300-$a$ improve on unequalized cases of reflecting light because skew mirror 305 is configured to reflecting light toward the eye box 315.

In some cases, a volume holographic grating may include holographic structures that are Bragg matched for combinations of angles and wavelengths that differ from each other. That is, within the grating medium, wavelengths of light that differ from each other are reflected along a same reflective axis based on holographic grating structures that differ from each other. Holograms corresponding to reflected light rays similarly situated with respect to the regions of the grating medium 310 as reflected light ray 325 may likewise be omitted or included such that the reflected light rays are incident on the eye box 315, but not other areas (e.g., areas longitudinally adjacent to eye box 315 along the x-axis).

Therefore, according to examples of the present disclosure, incident light 330 may be selectively reflected by a hologram that is at least partially disposed in the third region 316 of the grating medium 310 and will cause incident light 330 to be reflected as reflected light ray 325 toward eye box 315. That is, incident light 330 may be selectively reflected in the third region 316 for light rays having an angle of incidence corresponding to incident light 330. Similarly, incident light 332 may be selectively reflected by a hologram that is at least partially disposed in the second region 314 of the grating medium 310 and will cause incident light 332 to be reflected as reflected light ray 327 toward eye box 315. That is, incident light 332 may be selectively reflected in the second region 314 for light rays having an angle of incidence corresponding to incident light 332. In some examples, incident light 334 may be selectively reflected by a hologram that is at least partially disposed in the first region 312 of the grating medium 310 and will cause incident light 334 to be reflected as reflected light ray 329 toward eye box 315. That is, incident light 334 may be selectively reflected in the first region 312 for light having an angle of incidence corresponding to incident light 334.

Optical system 300-a is illustrated as reflecting light at a plane residing approximately at the center of the grating medium 310. However, persons skilled in the art recognize that light is typically reflected throughout the grating structure rather than at a specific plane. Additionally, for each reflected light ray intended to be directed to the eye box 315, one or more holograms in one or more grating structures of the grating medium 310 may be written for various wavelengths of visible red light, various wavelengths of visible blue light, and various wavelengths of visible green light.

In accordance with aspects of optical system 300-a, exit pupil equalization with skew mirror 305 and variations thereof may reduce the grating medium dynamic range required to achieve a desired level of performance, or increase the diffraction efficiency obtainable. Light reflected from skew mirror 305 may be desired only at eye box 315 (or another specific location in accordance with various implementations). The spatial distribution of the line segment-like k-space index distribution may be reduced so as to produce reflection only or mostly towards the eye box 315. In some examples, the irradiance profile upon the grating medium 310 to write a hologram during a single recording exposure may be substantially described by $$I(x) \propto rect\left[\frac{1}{d_{EB}}(x - d_{ER}\tan\theta_S)\right], \quad (7)$$

where $d_{EB}$ is the size of the eye box 315 and $d_{ER}$ is the distance from the eye box 315 to the hologram and grating structure within the grating medium 310, and $\theta_S$ is the angle the reflected beam makes with the z-axis. Therefore, in some examples, forming a grating structure within grating medium 310 may be based at least in part on a size (e.g., a length or width) of the eye box 315. In some examples, forming a grating structure within grating medium 310 may be based at least in part on a distance from the eye box 315 to the grating structure.

Figure 3B:
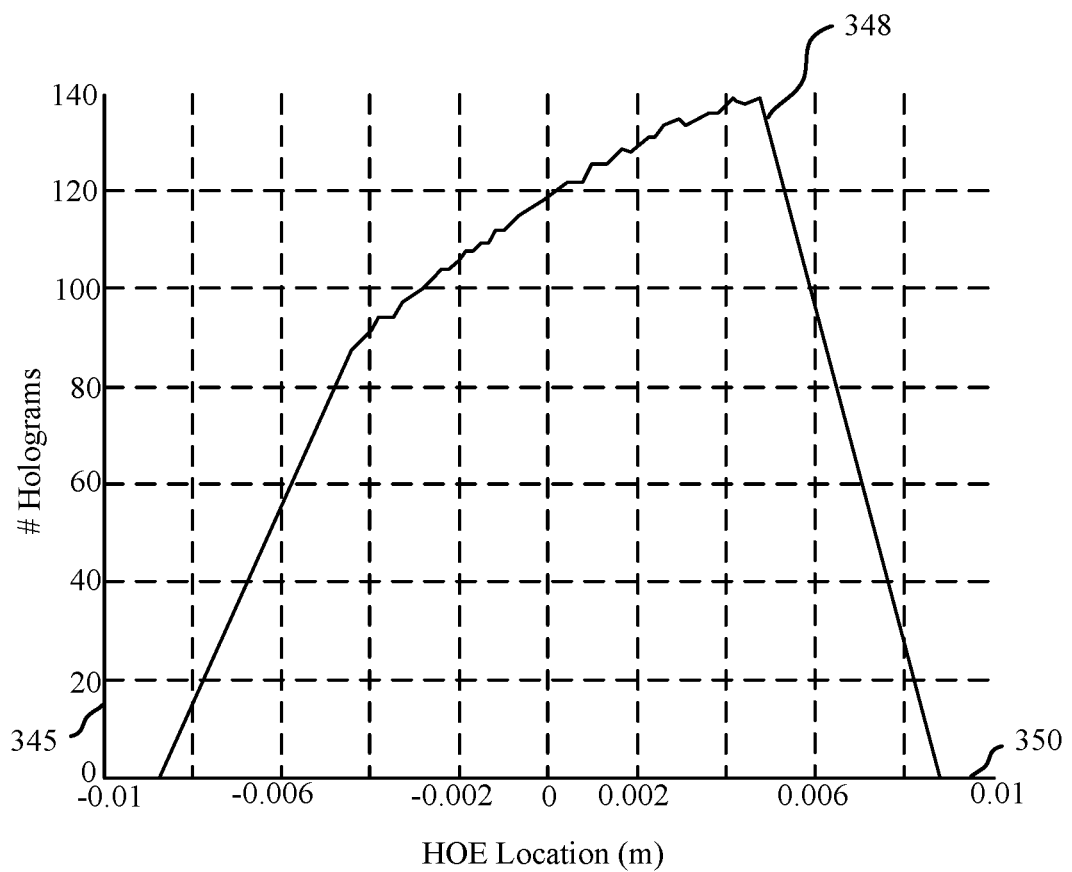
FIG. 3B is a plot that supports skew mirror pupil equalization in accordance with aspects of the present disclosure.

FIG. 3B is a plot that supports skew mirror pupil equalization in accordance with aspects of the present disclosure. Plot 300-b includes number of holograms on axis 345 and location of HOE (i.e., eye relief) on axis 350. Plot line 348 of plot 300-b illustrates an example of a reduction in maximum hologram multiplexing density for a 200 µm thick skew mirror coupler with a 30° field of view. Plot line 348 of plot 300-b also illustrates the total number of overlapping holograms that may be required at each longitudinal location along the HOE.

As described herein, an equivalent number of holograms (e.g., according to the full width at quarter maximum (FWQM) rule), which may need be recorded in a region of maximum hologram multiplexing density, may be reduced by a significant factor.

A successive hologram may be spaced or offset from a neighboring or adjacent hologram. Plot line 348 of plot 300-b illustrates the results in this spaced or offset distribution of successive holograms. That orientation corresponds to the first sheet (GratingTable_PupilEqualization) in the spreadsheet, where the gratings extend all the way across the medium (from −13 mm to +13 mm) along the y-axis, and are spaced apart (e.g., staggered) along the x-axis, each offset from its neighbor by a distance. The distance can be constant (e.g., 0.10 mm) and/or variable throughout one or more regions. As can be observed from plot line 348, a total number of overlapping holograms required at each longitudinal location along the grating medium 310 may be reduced by approximately 83% at 8 mm away from (e.g., below) the center of the grating medium 310 and by approximately 25% at 4 mm away from (e.g., below) the center of the grating medium 310 (e.g., a reduction in the total number of overlapping holograms in the first region 312 of the grating medium 310). Similarly, a total number of overlapping holograms required at each longitudinal location along the grating medium 310 may be reduced by approximately 75% at 8 mm away from (e.g., above) the center of the grating medium 310 and by approximately 17% at 6 mm away from (e.g., above) the center of the grating medium 310 (e.g., a reduction in the total number of overlapping holograms in the third region 316 of the grating medium 310). In this non-limiting example, skew mirror 305 may be equalized to produce a $d_{EB}$=4 mm eye box at a distance of $d_{ER}$=25 mm, and without exit pupil equalization, such a skew mirror device would require the multiplexing of 325 holograms everywhere along the 17.5 mm length of the skew mirror device. Using exit pupil equalization techniques described herein, the maximum hologram multiplexing density may be decreased to 139 holograms. This reduction represents only 42.8% of the unequalized density, potentially resulting in a 5.47× improvement in diffraction efficiency given the same recording material for the grating medium 310.

Additionally, it is to be understood that more than the three regions of the grating medium 310 may be employed in various embodiments. In some examples, a separate region may be employed for each hologram (or a grating structure having a set of similar holograms). In some examples, exit pupil equalization techniques as described herein may be applied for multiple color bands, producing, for example, three separate skew mirror grating frequency bands corresponding to a red wavelength (e.g., 610-780 nm) band, green wavelength (e.g., 493-577 nm) band, and blue wavelength (405-492 nm) band.

Figure 3C:
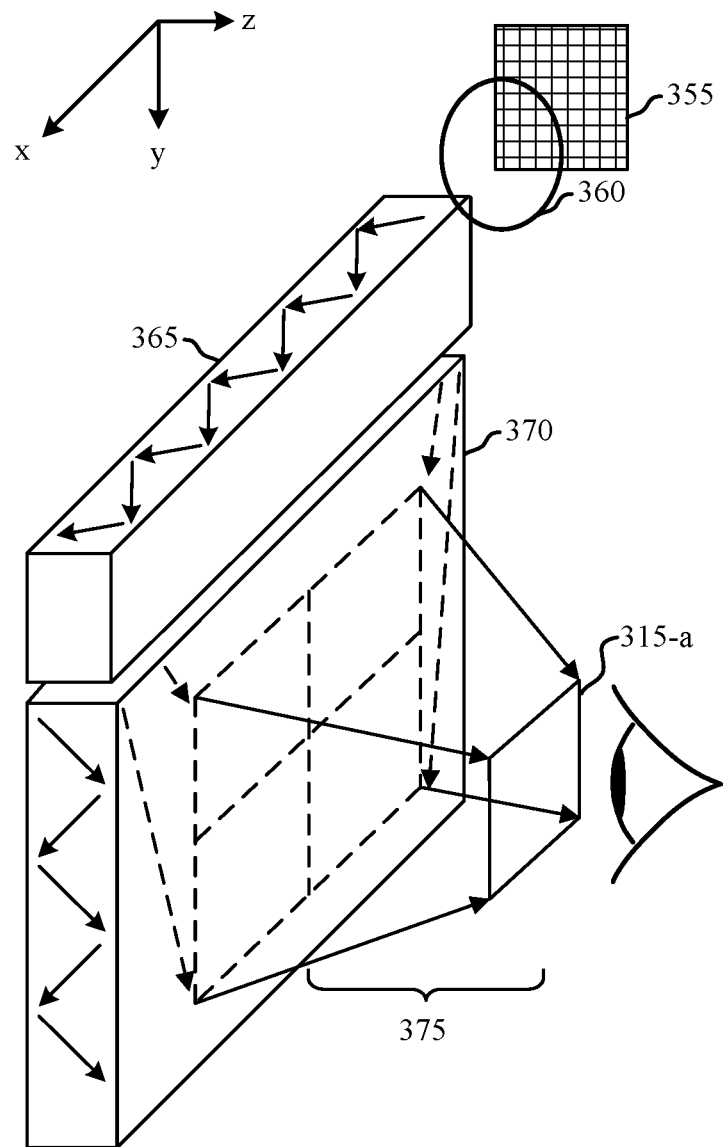
FIG. 3C is a diagram of an optical system incorporating skew mirror exit pupil equalization in accordance with various aspects of the disclosure.

FIG. 3C is a diagram of an optical system incorporating two-dimensional skew mirror exit pupil equalization in accordance with various aspects of the disclosure. Optical system 300-c may be utilized in an HMD, augmented reality (AR), or virtual reality (VR) application such as, but not limited to, the HMD 100 of FIG. 1. Optical system 300-c may also be utilized in various optical coupling applications such as, but not limited to, large screen display and optical sensor applications. The optical system 300-c may employ selective coupling to allow a skew mirror 305 to diffract light towards a specific location, such as an eye box 315-a, thereby improving photometric efficiency (e.g., image brightness). This may have an advantageous effect of producing an exit pupil at the eye box 315-a. The exit pupil may be a fixed distance from the skew mirror 305. An exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration.

Optical system 300-c may include a display 355, a collimator 360, a horizontal waveguide 365, a vertical waveguide 370, and an eye box 315-a. Eye box 315-a may be a distance from the vertical waveguide 370 hereby known as the eye relief 375. Optical system 300-c illustrates an example of a two-dimensional pupil expander that may utilize skew mirrors. A skew mirror disposed in horizontal waveguide 365 may be referred to as a cross coupler. In some cases, a skew mirror disposed in the vertical waveguide 370 may be referred to as an output coupler.

The exit pupil equalization techniques as described herein may be used to provide two-dimensional pupil expansion by utilizing two skew mirrors. For example, a horizontal waveguide 365 may include a first skew mirror that is operatively coupled to a second skew mirror. The first skew mirror may be used to expand the pupil in a horizontal direction (e.g., along the x-axis in conjunction with the y-axis as shown with respect to skew mirror 305 in FIG. 3A). In some examples, the first skew mirror (e.g., a cross coupler) may be disposed within a separate 2D (duct-type) waveguide. The second skew mirror may be used to expand the pupil in a vertical direction (e.g., along the y-axis as shown with respect to skew mirror 305 in FIG. 3). In some examples, the second skew mirror (e.g., an output coupler) may be disposed within a separate 1D (slab-type) waveguide. In some examples, the first skew mirror (e.g., a cross coupler) and the second skew mirror (e.g., an output coupler) may be disposed within a single 1D (slab-type) waveguide. In some examples, the first skew mirror and the second skew mirror may abut or be otherwise operatively coupled vertically (e.g., along the y-axis). In some examples, the first skew mirror and the second skew mirror may abut or be otherwise operatively coupled horizontally (e.g., along the x-axis). In some examples, the first skew mirror and the second skew mirror may abut or be otherwise operatively coupled in an overlapping manner (e.g., along the z-axis).

In some examples, the first skew mirror (e.g., a cross coupler) may employ selective coupling to implement the exit pupil equalization techniques as described herein. In some examples, the second skew mirror (e.g., an output coupler) may independently employ selective coupling to implement the exit pupil equalization techniques as described herein.

Figure 4A:
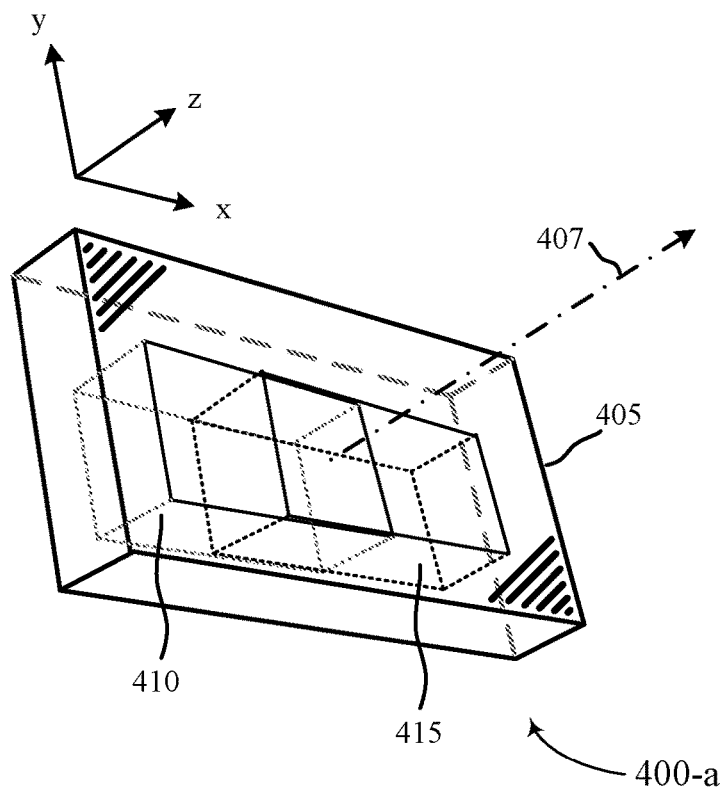
FIG. 4A is a perspective view of an optical structure that supports skew mirror pupil equalization in accordance with aspects of the present disclosure.

FIG. 4A is a perspective view of an optical structure 400-a that supports skew mirror pupil equalization in accordance with various aspects of the present disclosure. Optical structure 400-a may include aspects a skew mirror 110 of the HMD 100 in FIG. 1, skew mirror 210 in FIG. 2A, and/or skew mirror 305 in FIG. 3. Optical structure 400-a may include a grating medium 405, a first grating structure 410, and a second grating structure 415.

The optical structure 400-a may employ selective coupling to form an external exit pupil (not shown) where all or most reflected light is directed. The diffraction efficiency and the photometric efficiency of a system may be increased by incorporating the optical structure 400-a comprising skew mirror exit pupil equalization techniques. Optical structure 400-a may be substantially clear such that grating structures using one or more holograms within the a grating medium 405 are invisible (or nearly invisible) to the eye. In an application, such as a head mounted display, light may be diffracted from a skew mirror towards a specific location, such as an eye box (not shown) that may generally align with the external exit pupil.

The first grating structure 410 and the second grating structure 415 may each be configured to reflect light of a particular wavelength about a reflective axis offset from a surface normal of the grating medium at a plurality of incidence angles. In some examples, each of the first and second grating structures may include a plurality of holograms that form the grating structures. For ease of understanding, each of the first grating structure 410 and the second grating structure 415 is generally discussed as a single hologram. Embodiments of optical structure 400-a, however, are not limited to such single hologram grating structures.

The first grating structure 410 within the grating medium 405 may be configured to reflect light of a wavelength about a first reflective axis offset from a surface normal 407 of the grating medium at a first incidence angle. The second grating structure 415 within the grating medium 405 may be disposed so that the second grating structure 415 is at least partially non-overlapping with the first grating structure 410. The second grating structure 415 may be configured to reflect light of the wavelength about a second reflective axis offset from the surface normal 407 of the grating medium 405 at a second incidence angle different from the first incidence angle. The first grating structure 410 and the second grating structure 415 may each comprise a hologram or a sinusoidal volume grating. In some embodiments, either holograms or non-holography sinusoidal volume gratings are used in the grating medium 405 of optical structure 400-a. In other embodiments, both holograms and non-holography sinusoidal volume gratings may be used in the same grating medium 405.

The first grating structure 410 may be partially spatially overlapping with the second grating structure 415 such that the optical characteristics (e.g., varying refractive index properties and associated fringe patterns) of the first grating structure 410 and the second grating structure 415 are superimposed or intermingled. In some examples, the first reflective axis is substantially parallel to the second reflective axis. In some examples, the first incidence angle and the second incidence angle differ by at least 5°.

In one example, the first grating structure 410 is further configured to reflect light of the wavelength about the first reflective axis offset from the surface normal 407 of the grating medium 405 at a first range of incidence angles. This first range of incidence angles can include the first incidence angle discussed above. Each incidence angle of the first range of incidence angles may be greater than the second incidence angle. Additionally, incidence angle of the first range of incidence angles may correspond to a respective hologram (e.g., the first grating structure 410 comprises a plurality of holograms in this example). The first grating structure 410 may comprise at least three holograms (e.g., for reflecting light of the same wavelength). Each of the at least three holograms may correspond to a unique incidence angle within the first range of incidence angles. An adjacent $|\Delta K_G|$ for the at least three holograms may have a mean value that resides between $1.0 \times 10^4$ and $1.0 \times 10^6$ radians per meter (rad/m). It is to be understood that the at least three angles are described in this example to illustrate the $|\Delta K_G|$ relationship of adjacent holograms in a grating structure, and many holograms corresponding to many unique incidence angles may be included in first grating structure 410 and other grating structures within the grating medium 405.

The first grating structure 410 and the second grating structure 415 are describe as reflecting a wavelength of light (e.g., a visible red light wavelength, a visible blue light wavelength, or a visible green light wavelength), and therefore optical device 400-$a$ may be described in a monochromatic sense, but example of optical device 400-$a$ generally include grating structures configured to reflect multiple wavelengths of light. For example, the first grating structure 410 may be further configured to reflect light of a plurality of wavelengths at the first incidence angle and the second grating structure 415 may be further configured to reflect light of the plurality of wavelengths at the second incidence angle. In some embodiments, the plurality of wavelengths includes a visible red light wavelength (e.g., 618 nm), a visible blue light wavelength (e.g., 460 nm), and a visible green light wavelength (e.g., 518 nm). In other embodiments, the plurality of wavelengths includes two or more visible red light wavelengths from a visible red light wavelength range, two or more visible blue light wavelengths from a visible blue light wavelength range, and two or more visible green light wavelengths from a visible green light wavelength range.

When optical structure 400-$a$ is included in a waveguide application, each grating structure may be configured to reflect a portion of light toward an exit pupil located at a fixed distance from the optical structure 400-$a$. For example, a waveguide may be configured to convey light from a light input region of the waveguide to the first grating structure 410 and the second grating structure 415. The grating medium 405 may be disposed at least partially within the waveguide and may be covered or enclosed by opposing substrates.

Figure 4B:
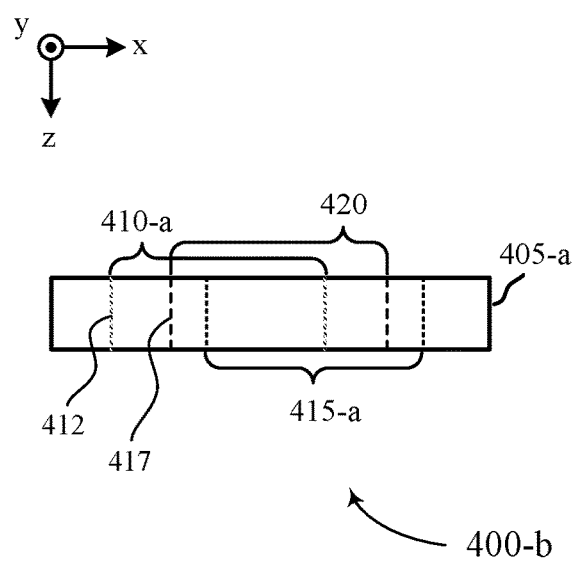
FIGS. 4B and 4C are plan views of optical structures that supports skew mirror pupil equalization in accordance with aspects of the present disclosure.

FIG. 4B is a plan view of an optical structure 400-$b$ that supports skew mirror pupil equalization in accordance with various aspects of the present disclosure. Optical structure 400-$b$ may include aspects a skew mirror 110 of the HMD 100 in FIG. 1, skew mirror 210 in FIG. 2A, skew mirror 305 in FIG. 3, and/or optical structure 400-$a$ of FIG. 4A. Optical structure 400-$b$ may include a grating medium 405-$a$, a first grating structure 410-$a$, a second grating structure 415-$a$, and a third grating structure 420.

The third grating structure 420 may be disposed within the grating medium 405-$a$ with other grating structures. In some cases, the third grating structure 420 may be disposed between the first grating structure 410-$a$ and the second grating structure 415-$a$. The third grating structure 420 may be at least partially non-overlapping with the first grating structure 410-$a$ and at least partially non-overlapping with the second grating structure 415-$a$. The third grating structure may be configured to reflect light of the wavelength (e.g., the same wavelength of light as that which is reflected by the first grating structure 410-$a$ and the second grating structure 415-$a$) about a third reflective axis offset from the surface normal 407 of the grating medium 405 at a third incidence angle different from the first incidence angle and the second incidence angle. In some examples, the third reflective axis is substantially parallel to the first reflective axis and the second reflective axis. In some embodiments, the first incidence angle may be greater than the third incidence angle and the third incidence angle may be greater than the second incidence angle. In this manner, each of these incidence angles may be different in a non-negligible amount and perform a reflective function associated with one or more regions of the optical structure 400-$b$.

In some examples, the first grating structure 410-$a$ and the second grating structure 415-$a$ are each configured to reflect a portion of light toward an exit pupil (not shown in FIG. 4B, but illustrated in other figures and examples described herein). The exit pupil may be a fixed distance from a surface of the waveguide (e.g., a waveguide including grating medium 405) such that a first end 412 of first grating structure 410-$a$ that is non-overlapping with a first end 417 of the second grating structure 415-$a$ that is overlapping with the first grating structure 410-$a$ is farther from the exit pupil than the first end 417 of the second grating structure 415-$a$. In this manner, the exit pupil may be generally centered longitudinally (with respect to the grating medium 405-$a$) along the x-axis.

Figure 4C:
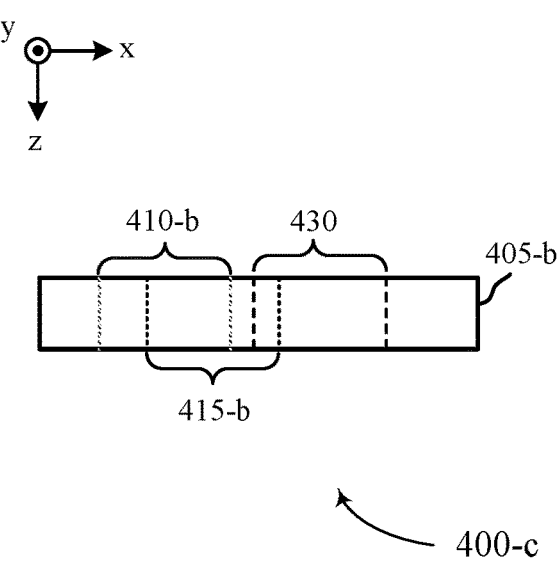

FIG. 4C is a plan view of an optical structure 400-$c$ that supports skew mirror pupil equalization in accordance with various aspects of the present disclosure. Optical structure 400-$c$ may include aspects a skew mirror 110 of the HMD 100 in FIG. 1, skew mirror 210 in FIG. 2A, skew mirror 305 in FIG. 3, optical structure 400-$a$ of FIG. 4A, and/or optical structure 400-$b$ of FIG. 4B. Optical structure 400-$c$ may include a grating medium 405-$b$, a first grating structure 410-$b$, a second grating structure 415-$b$, and a fourth grating structure 430.

The fourth grating structure 430 may be disposed within the grating medium 405-$b$ with other grating structures. In some cases, the fourth grating structure 430 is non-overlapping with the first grating structure 410-$b$. This occurs when a plurality of grating structures are spread across the grating medium 405-$b$ such that the length of grating structures, which may be generally uniform in length from one to the other, are shorter by at least half of the overall length of the grating medium 405-$b$. In some cases, the fourth grating structure 430 will also at least partially overlap with another grating structure, such as the second grating structure 415-$b$. The fourth grating structure 430 may be configured to reflect light of the wavelength about a fourth reflective axis offset from the surface normal 407 of the grating medium 405-$b$ at a fourth incidence angle different from the first incidence angle and the second incidence angle. In some examples, the fourth reflective axis is substantially parallel to the first reflective axis and the second reflective axis. In some embodiments, the first incidence angle may be greater than the second incidence angle and the second incidence angle may be greater than the fourth incidence angle.

It is to be understood that the third and fourth designations used for the third grating structure 420 in FIG. 4B and the fourth grating structure 430 in FIG. 4C are arbitrary designations and can be considered simply as another or an additional grating structure grating structure to the first and second grating structures. The third grating structure 420 and the fourth grating structure 430 illustrate non-limiting examples of the partially overlapping and non-overlapping features of grating structures associated with skew mirror pupil equalization.

Figure 5:
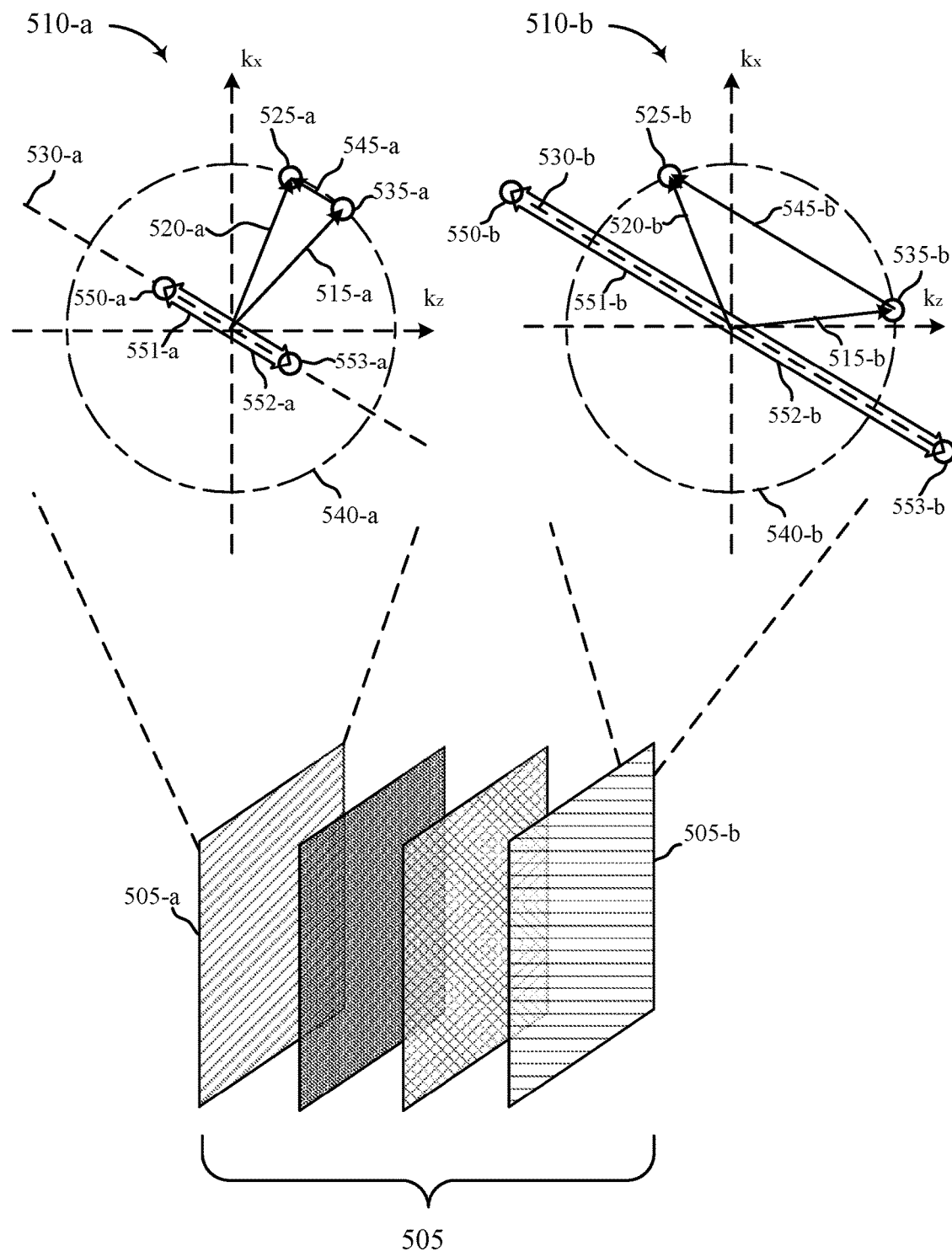
FIG. 5 is a diagram of an optical component illustrating a plurality of grating structures in accordance with various aspects of the disclosure.

FIG. 5 is a diagram of an optical component 500 illustrating a plurality of grating structures 505. Grating structures 505 may be similar to the grating structures described in reference to FIGS. 3 and 4. Grating structures 505 are illustrated in an exploded view manner for discussion purposes, but these grating structures 505 may overlap and intermingle within a volume or space of a grating medium as described herein (e.g., FIGS. 4A-4C). Also, each grating structure may have a different diffraction angle response and may reflect light at a wavelength that is different than another grating structure.

Optical component 500 depicts a grating structure 505-a and a grating structure 505-b. The grating structure 505-a may have a corresponding k-space diagram 510-a, and the grating structure 505-b may have a corresponding k-space diagram 510-b. The k-space diagrams 510-a and 510-b may illustrate cases of Bragg-matched reconstruction by illuminating a hologram.

The k-space diagram 510-a may illustrate the reflection of an incident light by the grating structure 505-a. The k-space diagram 510-a is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 510-a has a positive sideband $\Delta n(\vec{k})$ k-space distribution 550-a that has an angle measured with respect to the z-axis, equal to that of the reflective axis 530-a of the grating structure 505-a. The k-space diagram 510-a also has a negative sideband $\Delta n(\vec{k})$ k-space distribution 553-a that has an angle measured with respect to the z-axis, equal to that of the reflective axis 530-a. The k-sphere 540-a may represent visible blue light, visible green light, or visible red light.

The k-space diagram 510-a depicts a case where probe beam 535-a produces a diffracted beam k-space distribution 525-a, $E_d(\vec{k})$, that is point-like and lies on the probe beam k-sphere 540-a. The diffracted beam k-space distribution 525-a is produced according to the convolution of Equation (4).

The probe beam 535-a has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 520-a, $\vec{k}_p$ represents a probe beam wave vector 515-a, and $\vec{K}_{G+}$ represents a positive sideband grating vector 551-a. Vector 545-a represents the sum of the probe beam wave vector 515-a and the positive sideband grating vector 551-a according to the convolution of Equation (4). The k-space diagram 510-a also has a negative sideband grating vector 552-a.

The probe beam wave vector 515-a and the diffracted beam wave vector 520-a necessarily form the legs of a substantially isosceles triangle. The equal angles of this triangle are necessarily congruent with the angle of incidence and angle of reflection, both measured with respect to the reflective axis 530-a. Thus, the grating structure 505-a reflects light in a substantially mirror-like manner about the reflective axis 530-a.

The k-space diagram 510-b may illustrate the reflection of an incident light by the grating structure 505-b. The grating structure 505-b may reflect incident light at a plurality of incidence angles that are different than the incidence angles reflected by the grating structure 505-a. The grating structure 505-b may also reflect light at a different wavelength than the grating structure 505-a. The k-space diagram 510-b is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 510-b has a positive sideband $\Delta n(\vec{k})$ k-space distribution 550-b that has an angle measured with respect to the z-axis, equal to that of the reflective axis 530-b of grating structure 505-b. The k-space diagram 510-b also has a negative sideband $\Delta n(\vec{k})$ k-space distribution 553-b that has an angle measured with respect to the z-axis, equal to that of the reflective axis 530-b. The k-sphere 540-b may represent visible blue light, visible green light, or visible red light. In some embodiments, the k-sphere may represent other wavelengths of electromagnetic radiation, including but not limited to ultraviolet or infrared wavelengths.

The k-space diagram 510-b depicts a case where the probe beam 535-b produces a diffracted beam k-space distribution 525-b, $E_d(\vec{k})$, that is point-like and lies on the probe beam k-sphere 540-b. The diffracted beam k-space distribution 525-b is produced according to the convolution of Equation (4).

The probe beam 535-b has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 520-b, $\vec{k}_p$ represents a probe beam wave vector 515-b, and $\vec{K}_{G+}$ represents a positive sideband grating vector 551-b. Vector 545-b represents the sum of the probe beam wave vector 515-b and the positive sideband grating vector 551-b according to the convolution of Equation (4). The k-space diagram 510-b also has a negative sideband grating vector 552-b.

The probe beam wave vector 515-b and the diffracted beam wave vector 520-b necessarily form the legs of a substantially isosceles triangle. The equal angles of this triangle are necessarily congruent with the angle of incidence and angle of reflection, both measured with respect to the reflective axis 530-b. Thus, the grating structure 505-b reflects light in a substantially mirror-like manner about the reflective axis 530-b.

Figure 6A:
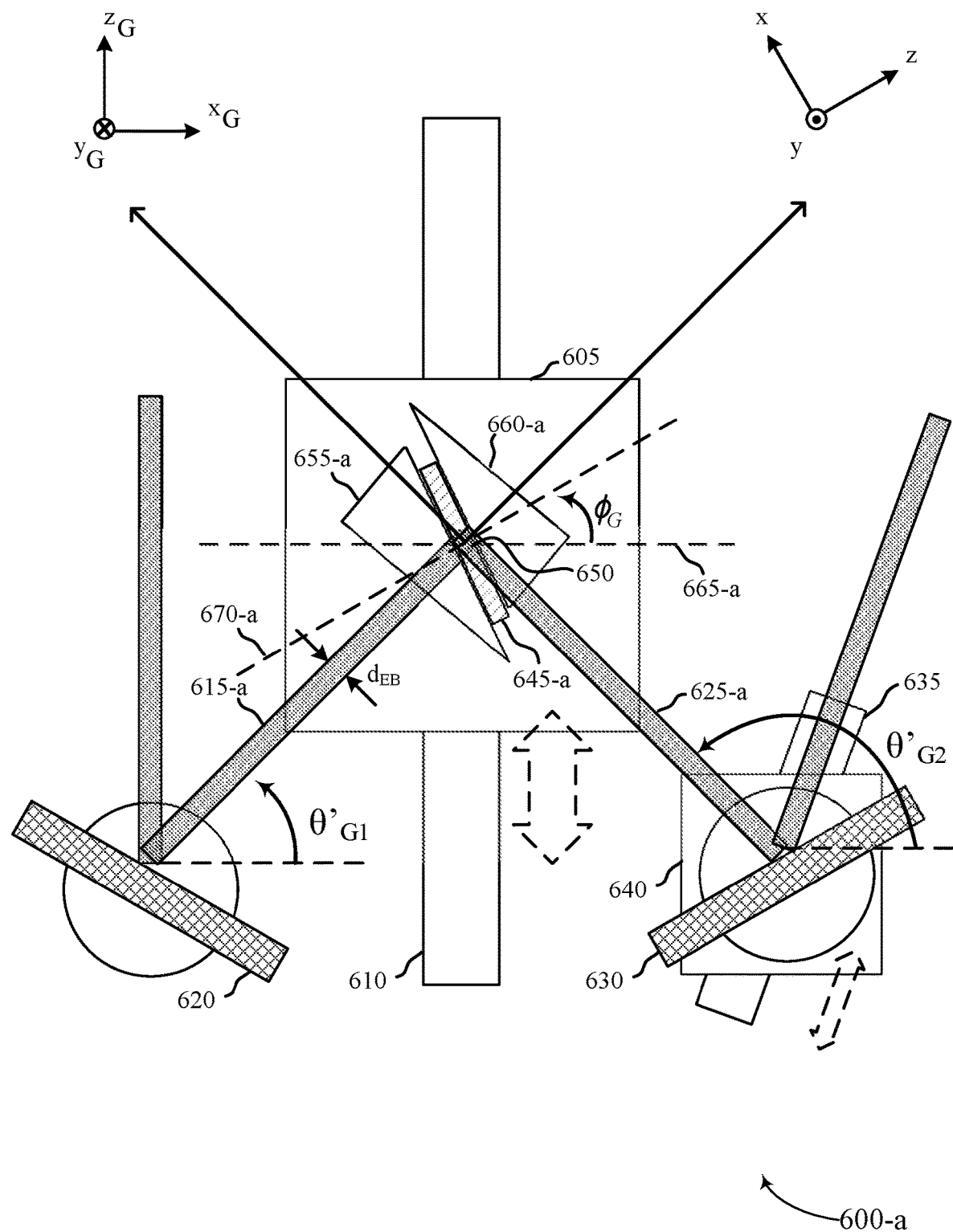
FIGS. 6A through 6D illustrate diagrams of systems that can be used to manufacture a skew mirror with pupil equalization in accordance with various aspects of the disclosure.

FIG. 6A is a system 600-a for manufacturing a skew mirror with pupil equalization in accordance with various aspects of the disclosure. System 600-a may include a sample stage carrier 605, a sample carrier rail 610, a first recording beam 615-a, a signal mirror 620, a second recording beam 625-a, a reference mirror 630, a reference mirror carrier rail 635, a reference mirror carrier 640, a grating medium 645-a, a hologram 650, a first prism 655-a, and a second prism 660-a.

System 600-a may include global coordinates ($x_G$, $y_G$, $z_G$) and skew mirror coordinates (x, y, z). The origin may be defined to be in the center of the grating medium 645-a. In some cases, the grating medium 645-a may comprise a generally rectangular shape where 'z' corresponds to the thickness of the grating medium 645-a, 'x' corresponds to the length of the in-plane side of the grating medium 645-a, and 'y' corresponds to the length of the in-plane side of the grating medium 645-a. The global angle for recording, $\theta_G$, may be defined as the angle of the first recording beam 615-a with respect to the $x_G$-axis inside grating medium 645-a. Skew mirror coordinates (x, y, z) may be converted to global coordinates by the following equation:

$$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & -\sin\phi_G \end{bmatrix} \begin{bmatrix} x \\ y \\ z \end{bmatrix} \quad (8)$$

The system 600-a may be used to configure recording beams to have a size approximately equal to a desired eye box size. In an implementation, the system 600-a may dispose rotating mirrors such as the signal mirror 620 and the reference mirror 630 to create the correct angles for the first recording beam 615-a and the second recording beam 625-a. The angle of the signal mirror 620 may be changed to produce a desired angle ($\theta_{G1}$) of first recording beam 615-a with width ~$d_{EB}$. The sample stage carrier 605 and the reference mirror carrier 640 may be positioned so as to illuminate the correct location with the recording beams for each exposure. The sample stage carrier 605 of the system 600-a may be positioned on the sample carrier rail 610 to facilitate the illumination of the grating medium 645-a with the first recording beam 615-a in the desired location. The reference mirror carrier 640 may be positioned on the reference mirror carrier rail 635 to facilitate the illumination of the grating medium 645-a with the second recording beam 625-a in the desired location. The grating medium 645-a may be referred to as a recording medium prior to or during hologram recording, and may include a photopolymer. In some embodiments, the grating medium may comprise photorefractive crystals, dichromated gelatin, photo-thermo-refractive glass, and/or film containing dispersed silver halide particles.

With the rotation of the signal mirror 620 and the reference mirror 630 set, the mirrors are arranged to direct the first recording beam 615-a and the second recording beam 625-a such that the recording beams intersect and interfere with each other to form an interference pattern that is recorded as a hologram 650 in the grating medium 645-a. The hologram 650 is an example of a grating structure. The system 600 may form multiple grating structures, each configured to reflect light of a particular wavelength about the skew axis 665-a at a plurality of incidence angles. Each grating structure may be formed using a plurality of exposures of the grating medium 645-a to coherent light having a particular wavelength. The plurality of incidence angles corresponding to each grating structure may be offset from one another by a minimum range of angles.

In some implementations, the recording beams may have widths that differ from each other, or they may be the same. The recording beams may each have the same intensity as each other, or intensity can differ among the beams. The intensity of the beams may be non-uniform. The grating medium 645-a is typically secured in place between the first prism 655-a and the second prism 660-a using a fluid index matched to both the prisms and the grating medium. A skew axis 665-a resides at a skew angle relative to the surface normal 670-a. As depicted in FIG. 6A, skew angle may be −30.25 degrees relative to the surface normal 670-a. The angle between the first and second recording beams may reside in a range from 0 to 180 degrees. The recorded skew angle relative to surface normal 670-a then becomes $\phi' = (\theta_{R1}+\theta_{R2}-180°)/2+\phi_G$ for in-plane system 600-a. For the nominal case where $\theta_{G2}=180°-\theta_{G1}$, $\phi'=\phi_G$. In FIG. 6A, $\theta_G$ shows the nominal skew angle relative to surface normal. Additionally, in FIG. 6A, the exact depiction of angles of $\theta_{G1}$ and $\theta_{G2}$ are not shown. The angles of $\theta'_{G1}$ and $\theta'_{G2}$ are illustrated and correspond to the angles of $\theta_{G1}$ and $\theta_{G2}$. The angles of $\theta_{G1}$ and $\theta_{G2}$ are in relation to the first recording beam 615-a and the second recording beam 625-a beam, respectively, within the first prism 655-a and the second prism 660-a. The angles of $\theta'_{G1}$ and $\theta'_{G2}$ will be different from angles of $\theta_{G1}$ and $\theta_{G2}$ because of an index of refraction mismatch at the boundary between air and the prisms when the recording beams enter the prisms (e.g., the effects of Snell's Law or the law of refraction).

The first recording beam 615-a and the second recording beam 625-a are nominally symmetrical about the skew axis 665-a such that the first recording beam internal angle relative to the skew axis plus the second recording beam internal angle relative to the skew axis is equal to 180 degrees. Each of the first and second recording beams are typically collimated plane wave beams originating from a laser light source.

Refraction at air/prism boundaries, for example where the first recording beam 615-a intersects an air/prism boundary of the first prism 655-a and where the second recording beam 625-a intersects an air/prism boundary of the second prism 660-a, is shown figuratively rather than strictly quantitatively. Refraction at the prism/grating medium boundary may also occur. In implementations, the grating medium and prisms each have an index of refraction of approximately 1.5471 at the recording beam wavelength of 405 nm.

A skew angle for a hologram (including a mean skew angle for a collection of holograms) can be substantially identical to a reflective axis angle, meaning the skew angle or mean skew angle is within 1.0 degree of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. It is understood that these medium shrinkage and system imperfections can be made arbitrarily small in the manufacture of skew mirrors with pupil equalization. In this regard, these medium shrinkage and system imperfections may be considered analogous to flatness of an ordinary or conventional mirror. In some examples, a fundamental limit associated with the manufacture of skew mirrors using volume holograms may be based on thickness of the recording medium.

A skew axis/reflective axis is generally called a skew axis when referring to making a skew mirror (for example when describing recording a hologram in a skew mirror grating medium), and as a reflective axis when referring to light reflective properties of a skew mirror. A skew angle for a hologram (including a mean skew angle for a collection of holograms) can be substantially identical to a reflective axis angle, meaning the skew angle or mean skew angle is within 1.0 degree of the reflective axis angle. Persons skilled in the art given the benefit of the present disclosure will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. Given the benefit of the present disclosure, persons skilled in the art will recognize that the skew angle for a given hologram is the same as the grating vector angle for that hologram.

In a variation of the system 600-$a$, a variable wavelength laser is used to vary the wavelength of the first and second recording beams. Incidence angles of the first and second recording beams may be, but are not necessarily, held constant while the wavelength of the first and second recording beams is changed. Wavelengths may be comprised of visible red light wavelength, visible blue light wavelength, visible green light wavelength, ultraviolet (UV) wavelength, and/or infrared (IR) wavelength. Each grating structure of the system 600-$a$ may reflect an incidence angle at a wavelength that is different than another grating structure. The system 600-$a$ may have reflective properties that allow it to reflect light at a substantially different wavelength, and in particular a considerably longer wavelength, than the recording beam wavelength.

Figure 6B:
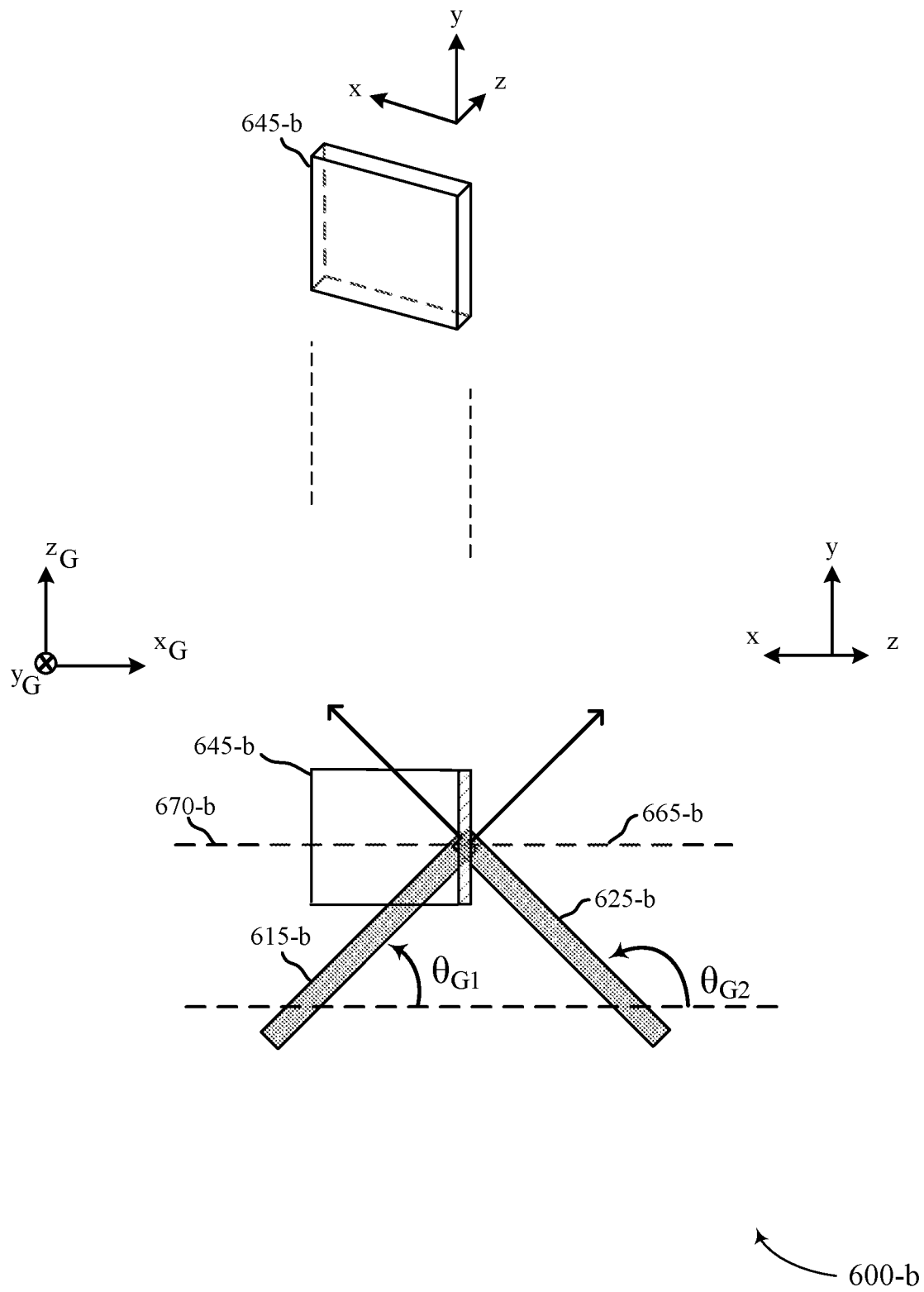
Figure 6C:
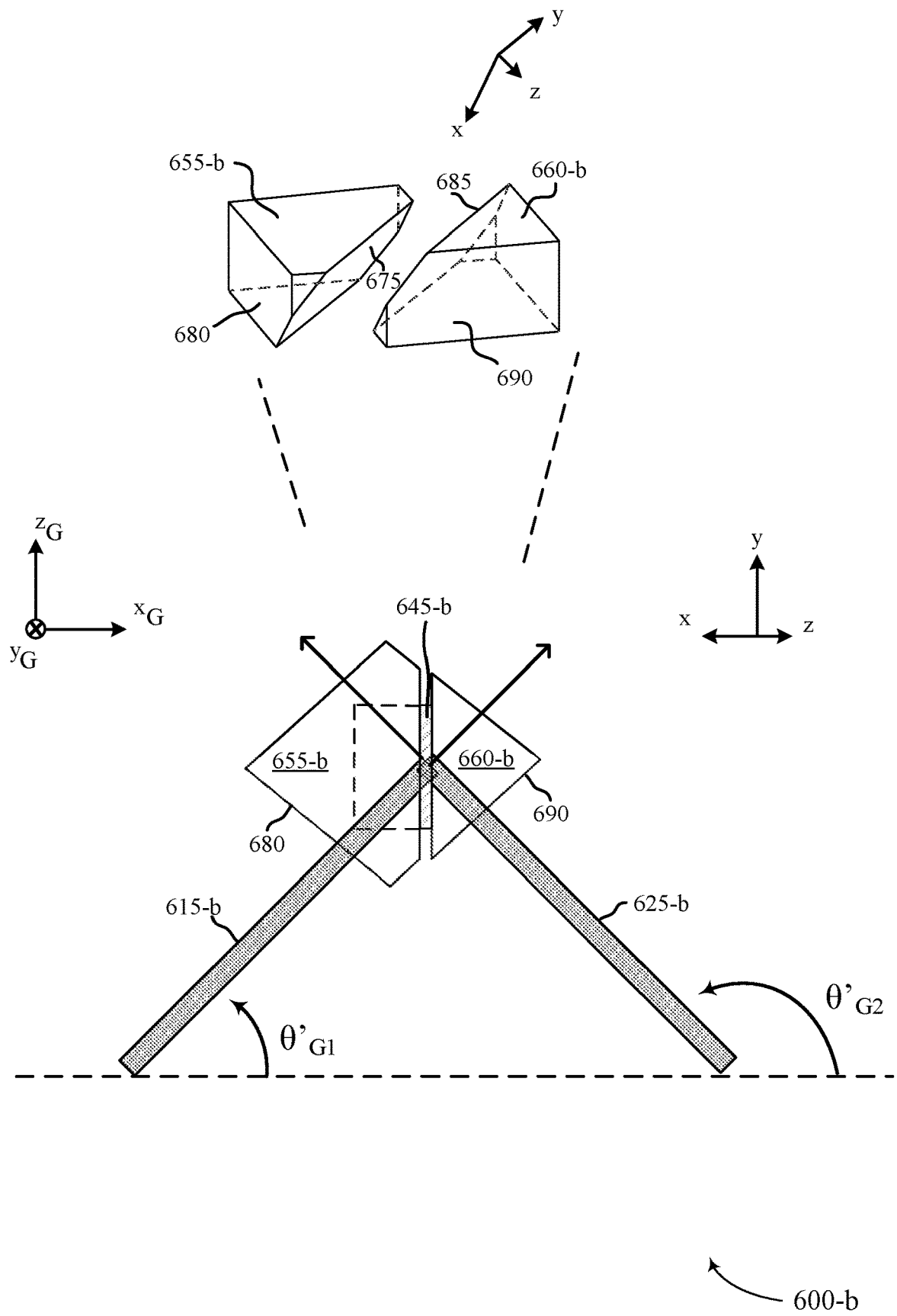
Figure 6D:
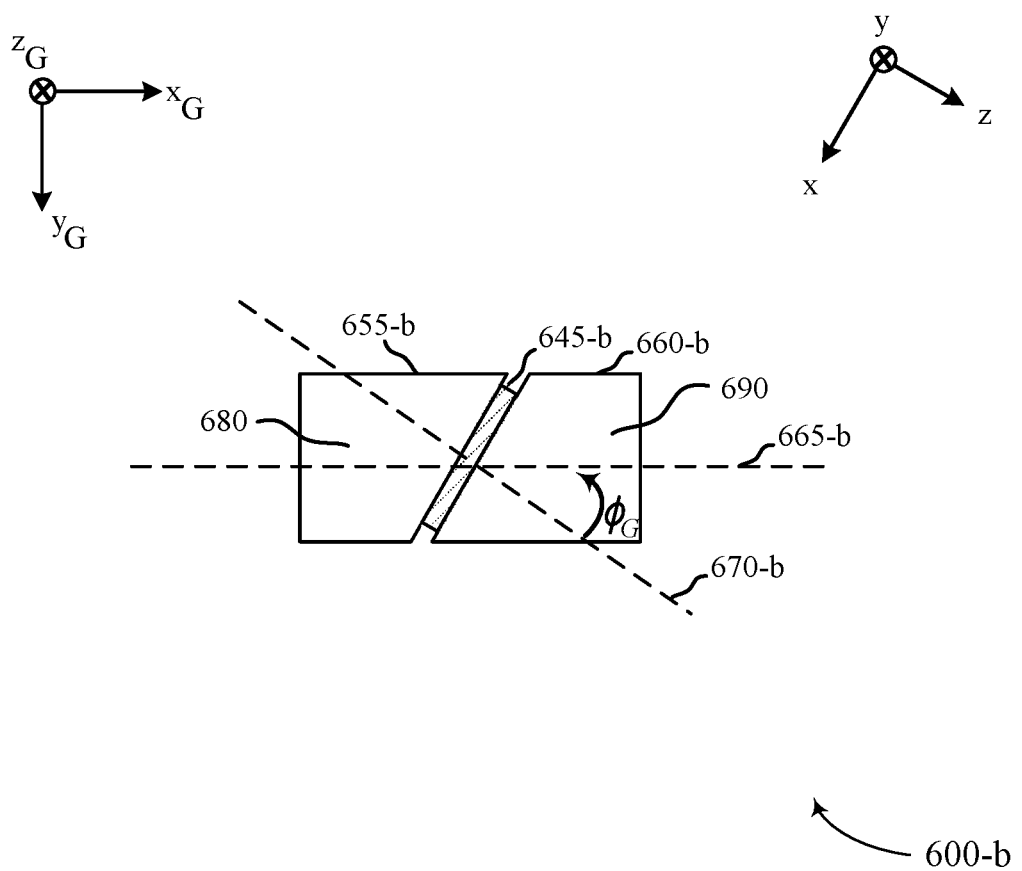

FIGS. 6B to 6D illustrate a system 600-$b$ for manufacturing a skew mirror with pupil equalization in accordance with various aspects of the disclosure. System 600-$b$ may include first recording beam 615-$b$, second recording 625-$b$, grating medium 645-$b$, skew axis 665-$b$, and surface normal 670-$b$. In some embodiments, skew mirror fabrication may include the method and configurations as described in system 600-$a$ with reference to FIG. 6A. System 600-$b$ may likewise include global coordinates ($x_G$, $y_G$, $z_G$) and skew mirror coordinates (x, y, z). In some examples, skew mirror fabrication may also involve the use of prisms in order to introduce the recording beams into a grating medium at angles that may be inaccessible due to the total internal reflection (TIR) constraint. For example, the use of tiger (total internal grazing-extension rotation) prisms (e.g., oblique-faced prisms) may be used. Tiger prisms may increase the accessibility of the angles of first recording beam 615-$b$ and second recording beam 625-$b$. Tiger prisms may also determine the skew axis 665-$b$. For example, skew axis 665-$b$ may reside in the $z_G$-$y_G$ plane and reside at the skew angle relative to the surface normal in the $z_G$-$y_G$ plane. For purposes of illustration, tiger prisms may be omitted from system 600-$b$. The angles of $\theta_{G1}$ and $\theta_{G2}$ are in relation to the first recording beam 615-$b$ and the second recording beam 625-$b$ beam, respectively, within the tiger prisms (not shown in FIG. 6B, but illustrated in FIGS. 6C and 6D).

The bottom portion of FIG. 6B illustrates a collapsed plane plan view (i.e., the x and z planes shown in the same plane) of the grating medium 645-$b$ to more clearly show aspects associated with or resulting from the oblique orientation of the grating medium 645-$b$ within the tiger prism configuration. A perspective view of the grating medium 645-$b$ with perspective view coordinates is illustrated above the collapsed plane plan view of the grating medium 645-$b$.

In some cases, the grating medium 645-$b$ may be orientated differently between first prism 655-$a$ and second prism 660-$a$. That is, grating medium 645-$a$ may be placed between first prism 655-$a$ and second prism 660-$a$ at an angle $\phi_G$. In some cases, skew mirror coordinates may be converted to global coordinates by the following equation:

$$\begin{bmatrix} x_G \\ y_G \\ z_G \end{bmatrix} = \begin{bmatrix} \sin\phi_G & 0 & \cos\phi_G \\ \cos\phi_G & 0 & -\sin\phi_G \\ 0 & 1 & 0 \end{bmatrix} \begin{bmatrix} x \\ y \\ z \end{bmatrix} \quad (9)$$

As described herein, manufacturing a skew mirror using tiger prisms, first and second recording beams which are 405 nm wavelength, a skew angle of −30.25 degrees, $\Delta K_G$ of 4.34e4 rad/m between a hologram and its preceding adjacent hologram, and configured to reflect light at 460 nm may yield results identified in TABLE 1.

TABLE 1

| # | First Recording Beam Angle (degrees) | Second Recording Beam Angle (degrees) | Alpha (degrees) | $|K_G|$ (×10$^7$ rad/m) | Incidence angle relative to skew/reflective axis (degrees) |
|---|---|---|---|---|---|
| 1 | 31.903 | 148.097 | 116.194 | 4.075 | 12.837 |
| 2 | 32.001 | 147.999 | 115.999 | 4.071 | 13.102 |
| 3 | 32.099 | 147.901 | 115.802 | 4.067 | 13.362 |
| . | . | . | . | . | . |
| . | . | . | . | . | . |
| . | . | . | . | . | . |
| 101 | 40.589 | 139.411 | 98.821 | 3.645 | 29.289 |
| 102 | 40.669 | 139.331 | 98.662 | 3.641 | 29.411 |
| 103 | 40.748 | 139.252 | 98.503 | 3.637 | 29.532 |
| . | . | . | . | . | . |
| . | . | . | . | . | . |
| . | . | . | . | . | . |
| 290 | 54.018 | 125.982 | 71.964 | 2.820 | 47.563 |
| 291 | 54.082 | 125.918 | 71.836 | 2.816 | 47.644 |
| 292 | 54.146 | 125.854 | 71.708 | 2.812 | 47.724 |

As shown in TABLE 1, the alpha may represent the difference between the two recording beams angles and may be calculated for each read wavelength (i.e., each wavelength of light the skew mirror may be configured to "reflect"). The $|K_G|$ may represent the grating frequency calculated from the first and second recording beams. The incidence angle relative to skew/reflective axis may be calculated from alpha (i.e., (180−alpha)/2). Lines 1-292 represent of abbreviated version of an example of gratings configured to reflect light at 460 nm. TABLE 1 illustrates that these gratings are configured to reflect 460 nm light at a range of incidence angles varying from about 47.7 to 12.8 degrees (relative to reflective axis), with a constant reflective axis. That is, the range of incidence angles may be 34.8 degrees.

As described herein, manufacturing a skew mirror using tiger prisms, first and second recording beams of 405 nm wavelength, a skew angle of −30.25 degrees, a $\Delta K_G$ of 4.34e4 rad/m between a hologram and its preceding adjacent hologram, and configured to reflect light at 518 nm may yield results identified in TABLE 2.

TABLE 2

| # | First Recording Beam Angle (degrees) | Second Recording Beam Angle (degrees) | Alpha (degrees) | $|K_G|$ ($\times 10^7$ rad/m) | Incidence angle relative to skew/reflective axis (degrees) |
|---|---|---|---|---|---|
| 1 | 41.144 | 138.856 | 97.712 | 3.615 | 13.109 |
| 2 | 41.223 | 138.777 | 97.555 | 3.611 | 13.402 |
| 3 | 41.301 | 138.699 | 97.398 | 3.606 | 13.688 |
| . | . | . | . | . | . |
| . | . | . | . | . | . |
| . | . | . | . | . | . |
| 101 | 52.204 | 127.796 | 75.593 | 2.942 | 37.570 |
| 102 | 52.269 | 127.731 | 75.462 | 2.938 | 37.680 |
| 103 | 52.335 | 127.665 | 75.331 | 2.933 | 37.789 |
| . | . | . | . | . | . |
| . | . | . | . | . | . |
| . | . | . | . | . | . |
| 257 | 58.506 | 121.494 | 62.987 | 2.508 | 47.497 |
| 258 | 58.567 | 121.433 | 62.866 | 2.503 | 47.588 |
| 259 | 58.628 | 121.372 | 62.744 | 2.499 | 47.679 |

As shown in TABLE 2, the alpha may represent the difference between the two recording beam angles and may be calculated for each read wavelength (i.e., each wavelength of light the skew mirror may be configured to reflect). The $K_G$ may represent the grating frequency calculated from the first and second recording beams. The incidence angle relative to skew/reflective axis may be calculated from alpha (i.e., (180−alpha)/2). Lines 1-259 represent an abbreviated version of gratings configured to reflect light at 460 nm. TABLE 2 illustrates that these gratings are configured to reflect 518 nm light at a range of incidence angles varying from about 47.7 to 12.8 degrees (relative to reflective axis), with a constant reflective axis. That is, the range of incidence angles may be 34.8 degrees.

As described herein, manufacturing a skew mirror using tiger prisms, first and second recording beams of 405 nm wavelength, a skew angle of −30.25 degrees, $\Delta K_G$ of 4.34e4 rad/m between a hologram and its preceding adjacent hologram, and configured to reflect light at 518 nm may yield results identified in TABLE 2.

length of light the skew mirror may be configured to "reflect"). The $K_G$ may represent the grating frequency calculated from the first and second recording beams. The incidence angle relative to skew/reflective axis may be calculated from alpha (i.e., (180−alpha)/2). Lines 1-217 represent an abbreviated version of gratings configured to reflect light at 618 nm. TABLE 3 illustrates that these gratings are configured to reflect 618 nm light at a range of incidence angles varying from about 47.7 to 12.9 degrees (relative to reflective axis), with a constant reflective axis. That is, the range of range of incidence angles may be 34.8 degrees.

As described herein, manufacturing a skew mirror using tiger prisms, first and second recording beams of 405 nm wavelength, a skew angle of −30.25 degrees, $|\Delta K_G|$ of 4.34e4 rad/m between a hologram and its preceding adjacent hologram, and configured to reflect light at 618 nm may yield results identified in TABLE 3.

FIG. 6C illustrates additional aspects of system 600-b for manufacturing a skew mirror for pupil equalization using tiger prisms. System 600-b may include first recording beam 615-b, second recording beam 625-b, grating medium

TABLE 3

| # | First Recording Beam Angle (degrees) | Second Recording Beam Angle (degrees) | Alpha (degrees) | $K_G$ ($\times 10^7$ rad/m) | Incidence angle relative to skew/reflective axis (degrees) |
|---|---|---|---|---|---|
| 1 | 50.880 | 129.120 | 78.240 | 3.029 | 13.210 |
| 2 | 50.947 | 129.053 | 78.107 | 3.024 | 13.555 |
| 3 | 51.013 | 128.987 | 77.973 | 3.020 | 13.892 |
| . | . | . | . | . | . |
| . | . | . | . | . | . |
| . | . | . | . | . | . |
| 101 | 58.080 | 121.920 | 63.840 | 2.538 | 35.331 |
| 102 | 58.141 | 121.859 | 63.718 | 2.534 | 35.469 |
| 103 | 58.202 | 121.798 | 63.596 | 2.529 | 35.606 |
| . | . | . | . | . | . |
| . | . | . | . | . | . |
| . | . | . | . | . | . |
| 215 | 64.006 | 115.994 | 51.989 | 2.104 | 47.448 |
| 216 | 64.063 | 115.937 | 51.873 | 2.100 | 47.557 |
| 217 | 64.121 | 115.879 | 51.758 | 2.095 | 47.665 |

As shown in TABLE 3, the alpha may represent the difference between the two recording beams angles and may be calculated for each read wavelength (i.e., each wave- 645-b, first prism 655-b, and second prism 660-b. The first recording beam 615-b, second recording beam 625-b, grating medium 645-b may be similar (but are not necessarily required to be identical) to these same numbered elements described with respect to FIG. 6B. In some embodiments, skew mirror fabrication may include the method and configurations as described in reference to FIG. 6A. System 600-*c* may likewise include global coordinates ($x_G$, $y_G$, $z_G$) and skew mirror coordinates (x, y, z). In some examples, first prism 655-*b* and second prism 660-*b* may be an example of tiger prisms. In some cases, first prism 655-*b* may "overhang" second prism 660-*b* and grating medium 645-*b*. In other examples, second prism 660-*b* may "undercut" first prism 655-*b* and grating medium 645-*b*. First prism 655-*b* and second prism 660-*b* may each have a surface that is oblique to the base of the prism and form an angle of $\theta_G$ with respect to the $y_G$-axis. That is, first prism 655-*b* and second prism 660-*b* may allow grating medium 645-*b* surface normal to be angled by $\theta_G$ out of the plane. First prism 655-*b* and second prism 660-*b* may allow the grating medium 645-*b* to be rotated −90° about the $x_G$-axis compared to FIG. 6A in order to "split the difference" between the first recording beam 615-*b* and second recording beam 625-*b* angles.

The bottom portion of FIG. 6C illustrates a collapsed plane plan view (i.e., the x and z planes shown in the same plane) of the grating medium 645-*b* to more clearly show aspects associated with or resulting from the oblique orientation of the grating medium 645-*b* within the tiger prism configuration. A perspective view of the first prism 655-*b* and second prism 660-*b* with perspective view coordinates is illustrated above the collapsed plane plan view of the grating medium 645-*b*. The first prism 655-*b* and second prism 660-*b* are spaced apart in the perspective view to show where the grating medium 645-*b* would be positioned in the tiger prism configuration.

As described herein, first prism 655-*b* and second prism 660-*b* may have prism faces that comprise the tiger prism configuration. For example, first prism 655-*b* may have a first prism face 675 that is oblique to the base of first prism 655-*b* and form an angle of $\phi_G$ with respect to the $y_G$-axis. First prism 655-*b* may also have a second prism face 680 where the first recording beam 615-*b* may enter the first prism 655-*b*. Second prism 660-*b* may have a third prism face 685 that is oblique to the base of the second prism 660-*b* and form an angle of $\phi_G$ with respect to the $y_G$-axis. Second prism 660-*b* may also have a fourth prism face 690 where the second recording beam 625-*b* may enter the second prism 660-*b*.

While the use of first prism 655-*b* and second 660-*b* (e.g., tiger prisms), described with reference to FIGS. 6B-6D, and first prism 655-*a* and second 660-*a* (e.g., in-plane prisms), described with reference to FIG. 6A, may be used to write equivalent skew mirrors having grating vectors aligned with the $x_G$-axis, first prism 655-*b* and second prism 660-*b* may able to access lower recording beam difference angles, alpha, than are accessible with in-plane prisms. That is, first prism 655-*b* and second prism 660-*b* may be used to record gratings having a lower frequency than can be written using in-plane prisms (using recording beams having the same wavelength). In some cases, a different set of first prism 655-*b* and second 660-*b* may be used to record gratings having a different vector angle, i.e., a different skew axis. First prism 655-*b* and second prism 660-*b* may also be index matched to grating medium 645-*b* and may affect the ability to write a grating vector.

FIG. 6D additional aspects of system 600-*b* for manufacturing a skew mirror for pupil equalization using tiger prisms. System 600-*b* may include grating medium 645-*b*, first prism 655-*b*, second prism 660-*b*, skew axis 665-*b*, and surface normal 670-*b*. For example, first prism 655-*b* and second prism 660-*b* may be an example of tiger prisms. In FIG. 6D, the tiger prism/medium assembly of system 600-*b* is illustrated from a perspective or orthogonal plane (i.e., rotated 90° about the $x_G$-axis) different from the perspective illustrated in FIG. 6C.

Nominal skew angle $\phi_G$ for grating medium 645-*b* is shown in FIG. 6D by the intersection of the skew axis 665-*b* and surface normal 670-*b*.

Figure 7:
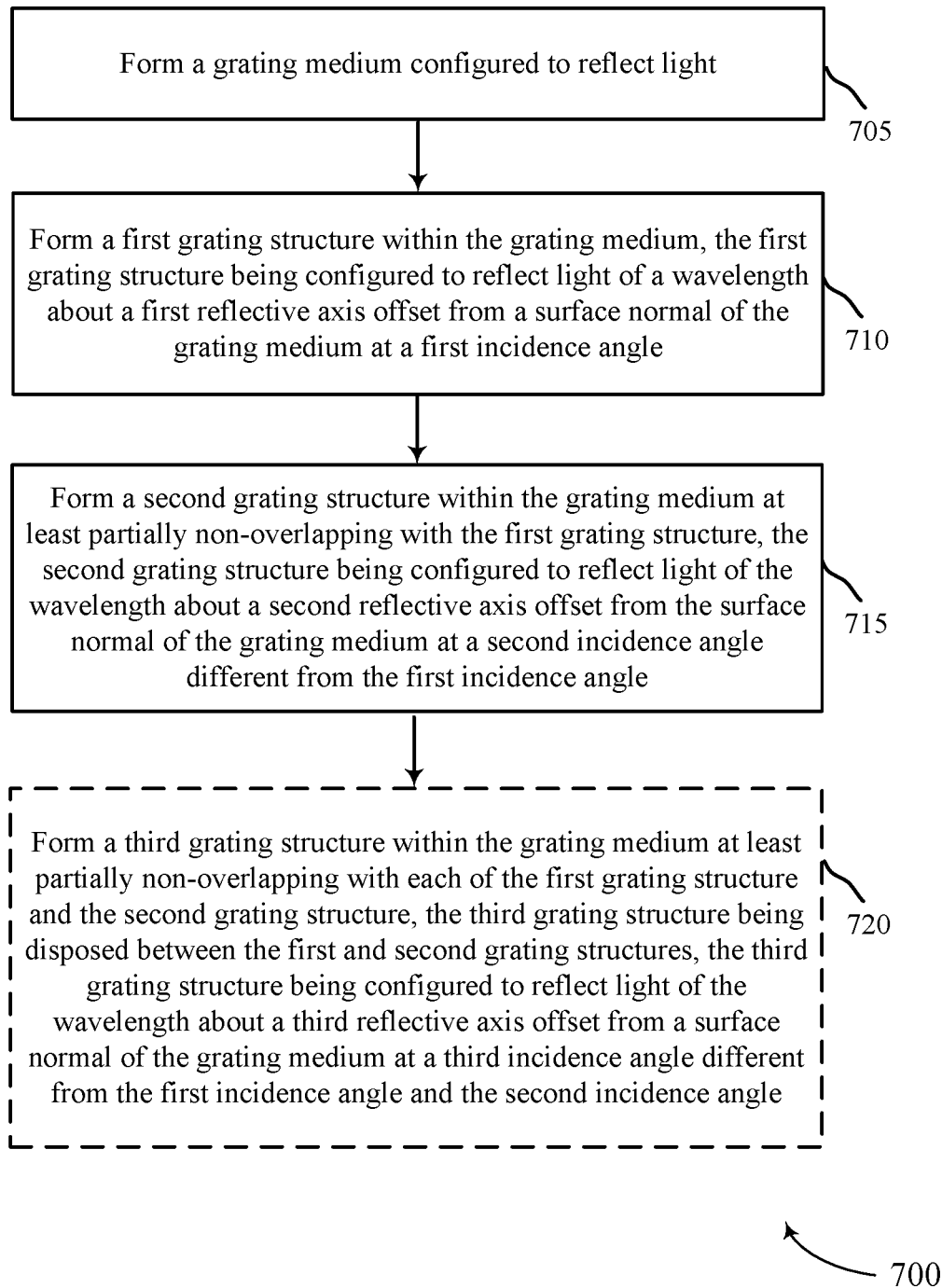
FIG. 7 is a flowchart diagram of an example method for manufacturing an apparatus for reflecting light in accordance with various aspects of the disclosure.

FIG. 7 is a flowchart diagram of an example method 700 of making an exit pupil equalization skew mirror for reflecting light, in accordance with various aspects of the disclosure. At block 705, a grating medium configured to reflect light is formed.

At block 710, a first grating structure is formed within the grating medium. The first grating structure may be configured to reflect light of a wavelength about a reflective axis offset from a surface normal of the grating structure at a first incidence angle. In some examples, the first grating structure may be configured to reflect light of the wavelength about the first reflective axis offset from the surface normal of the grating medium at a first range of incidence angles including the first incidence angle. In some examples, the first grating structure may comprise at least three holograms. Each of the at least three holograms may correspond to a unique incidence angle within the first range of incidence angles. The at least three holograms may be formed such that an adjacent $|\Delta K_G|$ for the at least three holograms has a mean value that resides between $1.0 \times 10^4$ and $1.0 \times 10^6$ radians per meter (rad/m). As such, a grating structure may be formed having a similar grating frequencies for angles different from each other.

The method 700 may further include forming a hologram with a skew axis such that a first recording beam and a second recording beam are symmetrical about the skew axis. The skew axis of the hologram forms the first reflective axis of the grating structure. The method 700 may include forming a hologram using a first recording beam of a write wavelength and a second recording beam of the write wavelength. The write wavelength (e.g., a 405 nm write wavelength) may be different from the wavelength of light (e.g., 618 nm wavelength of light selected for reflection at the first incidence angle) for which the first grating structure is configured to reflect. The method 700 may further include forming a hologram using a first recording beam and a second recording beam. The first recording beam may have a beam width that is based at least in part on a size of an exit pupil. The method 700 may include forming a sinusoidal volume grating using non-holographic surface deposition techniques.

At block 715, a second grating structure is formed within the grating medium. The second grating structure is at least partially non-overlapping with the first grating structure. The second grating structure may be configured to reflect light of the wavelength about a second reflective axis offset from the surface normal of the grating medium at a second incidence angle different from the first incidence angle. The first reflective axis may be substantially parallel to the second reflective axis. The first incidence angle and the second incidence angle may differ by at least 5°. In some cases, each incidence angle of the first range of incidence angles may be greater than the second incidence angle of the second grating structure.

Additionally at block 720, method 700 may optionally form a third grating structure within the grating medium at least partially non-overlapping with each of the first grating structure and second grating structure. The third grating structure may be disposed between the first and second grating structures. The third grating structure may be configured to reflect light of the wavelength about a third reflective axis offset from a surface normal of the grating structure at a third incidence angle different from the first incidence angle and the second incidence angle. The "third" qualifier in the third grating structure does not necessarily imply an order of recording the grating structures in the recording medium that forms the grating medium. The third grating structure is provided to describe various partially non-overlapping aspects of a plurality of grating structures within a grating medium in accordance with examples of a skew mirror for pupil expansion described herein.

The method 700 may further include forming a fourth grating structure within the grating medium non-overlapping with the first grating structure and at least partially overlapping with the second grating structure. The fourth grating structure may be configured to reflect light of the wavelength about a fourth reflective axis offset from the surface normal of the grating medium at a fourth incidence angle different from the first incidence angle and the second incidence angle. The "fourth" qualifier in the fourth grating structure also does not necessarily imply an order of recording the grating structures in the recording medium that forms the grating medium. The fourth grating structure is provided to describe various interrelated overlapping, partially non-overlapping, and entirely non-overlapping aspects of a plurality of grating structures within a grating medium in accordance with examples of a skew mirror for pupil expansion described herein.

Figure 8:
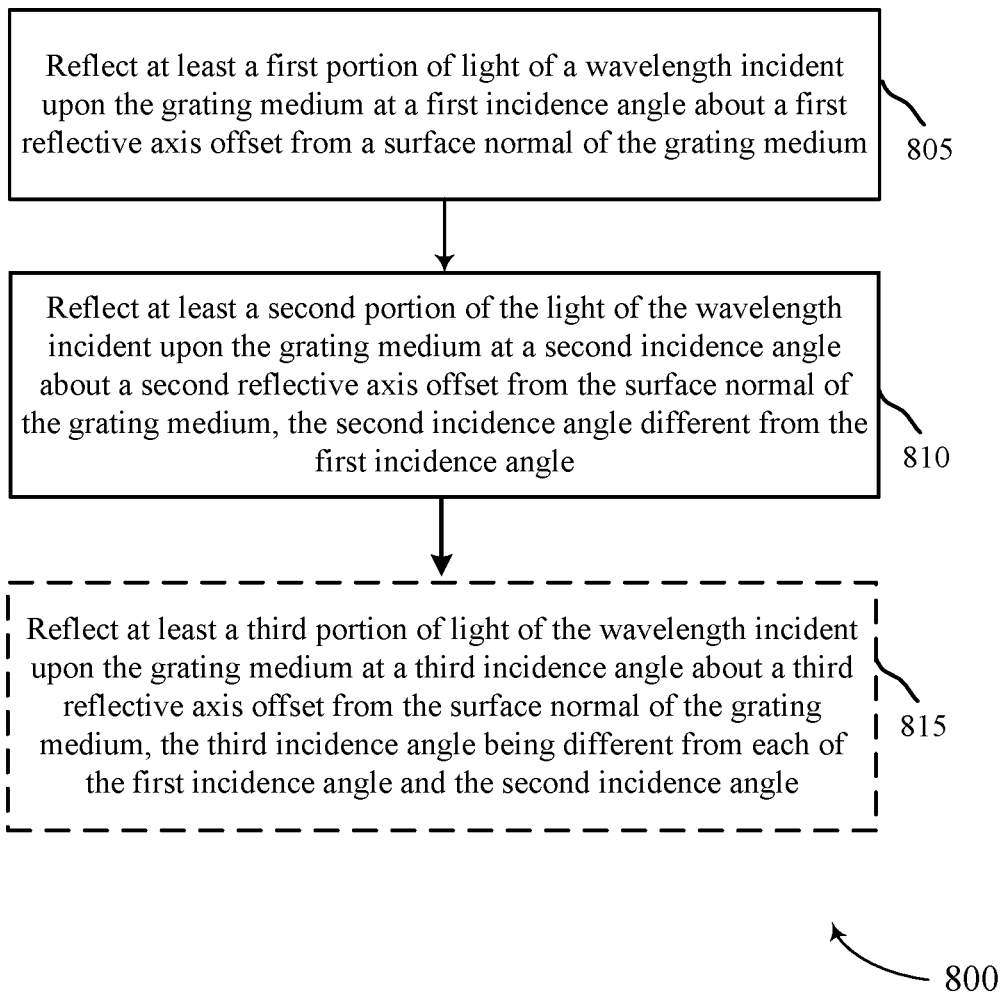
FIG. 8 is a flowchart diagram of an example method for reflecting light in accordance with various aspects of the disclosure.

FIG. 8 a flowchart diagram of an example method 800 for reflecting light, in accordance with various aspects of the disclosure. The method 800 may be performed, for example, by head mounted display 100 of FIG. 1, skew mirror 210 of FIG. 2A, optical system 300-a of FIG. 3A, optical system 300-c of FIG. 3C, optical structures 400-a of FIG. 4A, optical structures 400-b of FIG. 4B, and optical structures 400-c of FIG. 4C.

At block 805, method 800 may include reflecting, by a first grating structure within a grating medium, at least a first portion of light of a wavelength incident upon the grating medium at a first incidence angle. The first portion of light may be reflected about a first reflective axis offset from a surface normal of the grating medium. A portion of light may refer to incoherent light (e.g., from a light source such as a light-emitting diode) that exhibits characteristics (e.g., a particular wavelength or a particular angle of incidence) that allow the portion of light to be selectively reflected by a grating structure.

At block 810, method 800 may include reflecting, by a second grating structure within the grating medium, at least a second portion of the light of the wavelength incident upon the grating medium at a second incidence angle. The second portion of the light may be reflected about a second reflective axis offset from the surface normal of the grating medium. The second incidence angle may be different from the first incidence angle of the first grating structure.

The first reflective axis may be substantially parallel to the second reflective axis. In some examples, the first incidence angle and the second incidence angle may differ by at least 5°. In some cases, the grating medium may be disposed within a waveguide that includes the grating medium and at least two substrates. For example, the grating medium may be located at least partially within the waveguide configured to convey light from an input region of the waveguide. The first grating structure and the second grating structure may each be configured to reflect a respective portion of light incident upon the grating medium at their respective incidence angles toward an exit pupil. The exit pupil may be disposed a fixed distance from the waveguide. For example, the first portion of light incident upon the grating medium at the first incidence angle may be reflected by the first grating structure at a first reflection angle toward the exit pupil. The second portion of light incident upon the grating medium at the second incidence angle may be reflected by the second grating structure at a second reflection angle toward the exit pupil.

Additionally at block 815, method 800 may optionally include reflecting, by a third grating structure within the grating medium, at least a third portion of light of the wavelength incident upon the grating medium at a third incidence angle. The third portion of the light may be reflected about a third reflective axis offset from the surface normal of the grating medium. The third incidence angle may be different from each of the first incidence angle and the second incidence angle. The third grating structure may be at least partially non-overlapping with each of the first and second grating structures. The method 800 may further include reflecting, by a fourth grating structure within the grating medium, at least a fourth portion of light of the wavelength incident upon the grating medium at a fourth incidence angle. The fourth portion of the light may be reflected about a fourth reflective axis offset from the surface normal of the grating medium. The fourth incidence angle may be different from each of the first incidence angle and the second incidence angle. The fourth grating structure may be disposed in a non-overlapping manner with the first grating structure. The fourth grating structure may also be disposed in an at least partially overlapping manner with the second grating structure.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. A device for reflecting light, comprising:
  a grating medium;
  a first grating structure within the grating medium, the first grating structure being configured to reflect light of a wavelength about a first reflective axis offset from a surface normal of the grating medium at a first incidence angle; and
  a second grating structure within the grating medium at least partially non-overlapping with the first grating structure, the second grating structure being configured to reflect light of the wavelength about a second reflective axis offset from the surface normal of the grating medium at a second incidence angle different from the first incidence angle, wherein the first reflective axis is substantially parallel to the second reflective axis.

2. The device of claim 1, wherein the first incidence angle and the second incidence angle differ by at least 5°.

3. The device of claim 1, further comprising:
  a third grating structure within the grating medium at least partially non-overlapping with each of the first grating structure and the second grating structure, the third grating structure being disposed between the first and second grating structures, the third grating structure being configured to reflect light of the wavelength about a third reflective axis offset from a surface normal of the grating medium at a third incidence angle different from the first incidence angle and the second incidence angle.

4. The device of claim 3, wherein the first incidence angle is greater than the third incidence angle and the third incidence angle is greater than the second incidence angle.

5. The device of claim 1, further comprising:
  a fourth grating structure within the grating medium non-overlapping with the first grating structure and at least partially overlapping with the second grating structure, the fourth grating structure being configured to reflect light of the wavelength about a fourth reflective axis offset from the surface normal of the grating medium at a fourth incidence angle different from the first incidence angle and the second incidence angle.

6. The device of claim 5, wherein the first incidence angle is greater than the second incidence angle and the second incidence angle is greater than the fourth incidence angle.

7. The device of claim 1, wherein the first grating structure is further configured to reflect light of the wavelength about the first reflective axis offset from the surface normal of the grating medium at a first range of incidence angles including the first incidence angle, and wherein each incidence angle of the first range of incidence angles is greater than the second incidence angle.

8. The device of claim 7, wherein the first grating structure comprises at least three holograms, each of the at least three holograms corresponding to a unique incidence angle within the first range of incidence angles, and wherein an adjacent $|\Delta K_G|$ for the at least three holograms has a mean value that resides between $1.0 \times 10^4$ and $1.0 \times 10^6$ radians per meter (rad/m).

9. The device of claim 1, wherein at least one of the first grating structure or the second grating structure comprises a hologram.

10. The device of claim 1, wherein at least one of the first grating structure or the second grating structure comprises a sinusoidal volume grating.

11. The device of claim 1, wherein the wavelength comprises one of: a visible red light wavelength, a visible blue light wavelength, or a visible green light wavelength.

12. The device of claim 1, wherein the first grating structure is further configured to reflect light of a plurality of wavelengths at the first incidence angle and the second grating structure is further configured to reflect light of the plurality of wavelengths at the second incidence angle, and wherein the plurality of wavelengths includes at least two of a visible red light wavelength, a visible blue light wavelength, or a visible green light wavelength.

13. The device of claim 1, wherein the grating medium comprises a photopolymer.

14. The device of claim 1, wherein the grating medium comprises one of: photorefractive crystals, dichromated gelatin, photo-thermo-refractive glass, and film containing dispersed silver halide particles.

15. The device of claim 1, further comprising:
a waveguide configured to convey light from a light input region of the waveguide to the first and second grating structures, the grating medium disposed at least partially within the waveguide.

16. The device of claim 15, wherein the first grating structure and the second grating structure are each configured to reflect a portion of light toward an exit pupil, and wherein the exit pupil is a fixed distance from a surface of the waveguide such that a first end of first grating structure that is non-overlapping with a first end of the second grating structure that is overlapping with the first grating structure is farther from the exit pupil than the first end of the second grating structure.

17. The device of claim 1, further comprising:
a waveguide that includes the grating medium, wherein the first and second grating structures form part of an output coupler configured to couple the reflected light out of the waveguide and towards an eye box.

18. The device of claim 1, further comprising:
an input coupling prism configured to couple the light of the wavelength into the grating medium.

19. The device of claim 1, wherein the first grating structure has a first number of holograms and wherein the second grating structure has a second number of holograms, the second number being greater than the first number.

20. A head mounted display device, comprising:
a light source for providing image-bearing light; and
an optical lens comprising:
a light input section of the optical lens for receiving the image-bearing light, and
a waveguide disposed within the optical lens operatively coupled to the light input section, the waveguide comprising,
at least two substrates,
a grating medium disposed between the at least two substrates,
a first grating structure within the grating medium, the first grating structure being configured to reflect light of a wavelength about a first reflective axis offset from a surface normal of the grating medium at a first incidence angle, and
a second grating structure within the grating medium at least partially non-overlapping with the first grating structure, the second grating structure being configured to reflect light of the wavelength about a second reflective axis offset from the surface normal of the grating medium at a second incidence angle different from the first incidence angle, wherein the first reflective axis is substantially parallel to the second reflective axis.

21. The head mounted display device of claim 20, wherein the first grating structure and the second grating structure are each configured to reflect a portion of light toward an exit pupil, and wherein the exit pupil is a fixed distance from a surface of the waveguide such that a first end of first grating structure that is non-overlapping with a first end of the second grating structure that is overlapping with the first grating structure is farther from the exit pupil than the first end of the second grating structure.

22. The head mounted device of claim 20, wherein the first and second grating structures form part of an output coupler configured to couple the reflected light out of the waveguide and towards an eye box.

23. A method of manufacturing an apparatus for reflecting light, comprising:
forming a grating medium configured to reflect light;
forming a first grating structure within the grating medium, the first grating structure being configured to reflect light of a wavelength about a first reflective axis offset from a surface normal of the grating medium at a first incidence angle; and
forming a second grating structure within the grating medium at least partially non-overlapping with the first grating structure, the second grating structure being configured to reflect light of the wavelength about a second reflective axis offset from the surface normal of the grating medium at a second incidence angle different from the first incidence angle, wherein forming the first grating structure comprises:
forming a hologram using a first recording beam of a write wavelength and a second recording beam of the write wavelength, wherein the write wavelength is different from the wavelength of light for which the first grating structure is configured to reflect.

24. The method of claim 23, wherein the first reflective axis is substantially parallel to the second reflective axis.

25. The method of claim 23, wherein the first incidence angle and the second incidence angle differ by at least 5°.

26. The method of claim 23, further comprising:
forming a third grating structure within the grating medium at least partially non-overlapping with each of the first grating structure and the second grating structure, the third grating structure being disposed between the first and second grating structures, the third grating structure being configured to reflect light of the wavelength about a third reflective axis offset from a surface normal of the grating medium at a third incidence angle different from the first incidence angle and the second incidence angle.

27. The method of claim 23, further comprising:
forming a fourth grating structure within the grating medium non-overlapping with the first grating structure and at least partially overlapping with the second grating structure, the fourth grating structure being configured to reflect light of the wavelength about a fourth reflective axis offset from the surface normal of the grating medium at a fourth incidence angle different from the first incidence angle and the second incidence angle.

28. The method of claim 23, wherein the first grating structure is further configured to reflect light of the wavelength about the first reflective axis offset from the surface normal of the grating medium at a first range of incidence angles including the first incidence angle, and wherein each incidence angle of the first range of incidence angles is greater than the second incidence angle.

29. The method of claim 23, wherein the first grating structure comprises at least three holograms, each of the at least three holograms corresponding to a unique incidence angle within the first range of incidence angles, and wherein an adjacent $|\Delta K_G|$ for the at least three holograms has a mean value that resides between $1.0 \times 10^4$ and $1.0 \times 10^6$ radians per meter (rad/m).

30. The method of claim 23, wherein forming the first grating structure comprises:
forming a hologram with a skew axis such that a first recording beam and a second recording beam are symmetrical about the skew axis, wherein the skew axis of the hologram forms the first reflective axis of the grating structure.

31. A method of manufacturing an apparatus for reflecting light, comprising:
forming a grating medium configured to reflect light;
forming a first grating structure within the grating medium, the first grating structure being configured to reflect light of a wavelength about a first reflective axis offset from a surface normal of the grating medium at a first incidence angle; and
forming a second grating structure within the grating medium at least partially non-overlapping with the first grating structure, the second grating structure being configured to reflect light of the wavelength about a second reflective axis offset from the surface normal of the grating medium at a second incidence angle different from the first incidence angle, wherein forming the first grating structure comprises:
forming a sinusoidal volume grating using non-holographic surface deposition techniques.

32. A method for reflecting light, comprising:
reflecting, by a first grating structure within a grating medium, at least a first portion of light of a wavelength incident upon the grating medium at a first incidence angle about a first reflective axis offset from a surface normal of the grating medium; and
reflecting, by a second grating structure within the grating medium, at least a second portion of the light of the wavelength incident upon the grating medium at a second incidence angle about a second reflective axis offset from the surface normal of the grating medium, the second incidence angle being different from the first incidence angle, wherein the first reflective axis is substantially parallel to the second reflective axis.

33. The method of claim 32, wherein the first incidence angle and the second incidence angle differ by at least 5°.

34. The method of claim 32, further comprising:
reflecting, by a third grating structure within the grating medium and disposed and disposed at least partially non-overlapping with each of the first and second grating structures, at least a third portion of light of the wavelength incident upon the grating medium at a third incidence angle about a third reflective axis offset from the surface normal of the grating medium, the third incidence angle being different from each of the first incidence angle and the second incidence angle.

35. The method of claim 32, further comprising:
reflecting, by a fourth grating structure within the grating medium and disposed non-overlapping with the first grating structure and at least partially overlapping with the second grating structure, at least a fourth portion of light of the wavelength incident upon the grating medium at a fourth incidence angle about a fourth reflective axis offset from the surface normal of the grating medium, the fourth incidence angle being different from each of the first incidence angle and the second incidence angle.

36. The method of claim 32, wherein the grating medium is located at least partially within a waveguide configured to convey light from an input region of the waveguide, and wherein the reflecting, by the first grating structure within the grating medium, at least the first portion of light comprises:
reflecting, by the first grating structure within the grating medium, at least the first portion of light incident upon the grating medium at the first incidence angle about the first reflective axis offset from the surface normal of the grating medium toward an exit pupil disposed a fixed distance from the waveguide.

* * * * *